(12) United States Patent
Bhamri et al.

(10) Patent No.: US 11,265,111 B2
(45) Date of Patent: Mar. 1, 2022

(54) CONSECUTIVE DATA PACKET FEEDBACK

(71) Applicant: Lenovo (Singapore) Pte. Ltd., New Tech Park (SG)

(72) Inventors: Ankit Bhamri, Rodermark (DE); Ali Ramadan Ali, Munich (DE); Karthikeyan Ganesan, Kaiserslautern (DE); Joachim Loehr, Wiesbaden (DE); Prateek Basu Mallick, Dreieich (DE); Hyung-Nam Choi, Ottobrunn (DE); Ravi Kuchibhotla, Clarendon Hills, IL (US)

(73) Assignee: Lenovo (Singapore) PTE LTD, New Tech Park (SG)

( * ) Notice: Subject to any disclaimer, the term of this patent is extended or adjusted under 35 U.S.C. 154(b) by 0 days.

(21) Appl. No.: 16/740,319

(22) Filed: Jan. 10, 2020

(65) Prior Publication Data
US 2021/0218500 A1    Jul. 15, 2021

(51) Int. Cl.
| H04W 4/00 | (2018.01) |
| H04L 1/16 | (2006.01) |
| H04L 1/00 | (2006.01) |
| H04W 28/04 | (2009.01) |
| H04W 72/04 | (2009.01) |

(52) U.S. Cl.
CPC .......... *H04L 1/1607* (2013.01); *H04L 1/0021* (2013.01); *H04W 28/04* (2013.01); *H04W 72/042* (2013.01); *H04W 72/0413* (2013.01)

(58) Field of Classification Search
None
See application file for complete search history.

(56) References Cited

U.S. PATENT DOCUMENTS

| 2004/0224697 A1* | 11/2004 | Hakkinen | H04L 1/0081 |
| | | | 455/450 |
| 2015/0244429 A1* | 8/2015 | Zhang | H04B 7/024 |
| | | | 370/329 |
| 2015/0305041 A1* | 10/2015 | Kim | H04L 5/0037 |
| | | | 370/329 |
| 2016/0198453 A1* | 7/2016 | Hu | H04L 1/1864 |
| | | | 370/349 |
| 2017/0034850 A1* | 2/2017 | Rico Alvarino | H04W 72/14 |
| 2018/0279262 A1* | 9/2018 | Babaei | H04W 72/04 |
| 2018/0316619 A1* | 11/2018 | Hong | H04L 69/321 |

(Continued)

OTHER PUBLICATIONS

Ericsson, General discussion on RLC enhancements, 3GPP TSG-RAN WG2 Meeting #46 R2-050560, Feb. 14-18, 2005, pp. 1-3.

(Continued)

*Primary Examiner* — Clemence S Han
(74) *Attorney, Agent, or Firm* — Kunzler Bean & Adamson

(57) ABSTRACT

Apparatuses, methods, and systems are disclosed for consecutive data packet feedback. One method includes receiving a first set of consecutive data packets. The method includes transmitting feedback corresponding to the first set of consecutive data packets, wherein the feedback comprises: an error indication in response each data packet in the first set of consecutive data packets failing to be received correctly; a non-error indication in response to at least one data packet in the first set of consecutive data packets being received correctly; a counter value that indicates a consecutive number of data packet failures; or some combination thereof.

20 Claims, 12 Drawing Sheets

(56) References Cited

U.S. PATENT DOCUMENTS

| | | | | |
|---|---|---|---|---|
| 2018/0368203 A1* | 12/2018 | Shi | ............... | H04W 76/28 |
| 2019/0036654 A1* | 1/2019 | Kim | ............... | H04L 1/1607 |
| 2019/0268912 A1* | 8/2019 | Myung | ............... | H04W 72/0413 |
| 2020/0288531 A1* | 9/2020 | Iyer | ............... | H04W 4/70 |

OTHER PUBLICATIONS

Nokia, Nokia Shanghai Bell, Dynamic Adaptation of Uplink PDCP Duplication, 3GPP TSG-RAN WG2 Meeting #106 R2-1906190, May 13-17, 2019, pp. 1-4.

PCT/IB2020/000162, Invitation to Pay Additional Fees and, Where Applicable, Protest Fee, ISR, Oct. 6, 2020, pp. 1-12.

Nokia, Nokia Shanghai Bell, "New WID on enhanced Industrial Internet of Things (IoT) and URLLC support", 3GPP TSG RAN Meeting #86 RP-193233, Dec. 9-12, 2019. pp. 1-5.

3GPP, "3rd Generation Partnership Project; Technical Specification Group Services and System Aspects; Study on enhancements for cyber-physical control applications in vertical domains; Stage 1 (Release 17)", 3GPP TR 22.832 V17.1.0, Dec. 2019, pp. 1-91.

3GPP, "3rd Generation Partnership Project; Technical Specification Group Services and System Aspects; System architecture for the 5G System (5GS); Stage 2 (Release 16)", 3GPP TS 23.501 V16.3.0, Dec. 2019, pp. 1-417.

PCT/IB2020/000162, Notification of Transmittal of the International Search Report and the Written Opinion of the International Searching Authority, of the Declaration, ISR, dated Nov. 30, 2020, pp. 1-18.

\* cited by examiner

CONSECUTIVE DATA PACKET FEEDBACK

FIELD

The subject matter disclosed herein relates generally to wireless communications and more particularly relates to consecutive data packet feedback.

BACKGROUND

The following abbreviations are herewith defined, at least some of which are referred to within the following description: Third Generation Partnership Project ("3GPP"), 4$^{th}$ Generation ("4G"), 5$^{th}$ Generation ("5G"), 5G System ("5GS"), Positive-Acknowledgment ("ACK"), Aggregation Level ("AL"), Access and Mobility Management Function ("AMF"), Access Network ("AN"), Access Point ("AP"), Authentication Server Function ("AUSF"), Beam Failure Detection ("BFD"), Binary Phase Shift Keying ("BPSK"), Base Station ("BS"), Buffer Status Report ("BSR"), Bandwidth ("BW"), Bandwidth Part ("BWP"), Carrier Aggregation ("CA"), Contention-Based Random Access ("CBRA"), Clear Channel Assessment ("CCA"), Control Channel Element ("CCE"), Cyclic Delay Diversity ("CDD"), Code Division Multiple Access ("CDMA"), Control Element ("CE"), Contention-Free Random Access ("CFRA"), Configured Grant ("CG"), Closed-Loop ("CL"), Core Network ("CN"), Coordinated Multipoint ("CoMP"), Cyclic Prefix ("CP"), Cyclical Redundancy Check ("CRC"), Channel State Information ("CSI"), Channel State Information-Reference Signal ("CSI-RS"), Candidate Single-subframe Resources ("CSRs"), Common Search Space ("CSS"), Control Resource Set ("CORESET"), Device-to-Device ("D2D"), Discrete Fourier Transform Spread ("DFTS"), Downlink Control Information ("DCI"), Dynamic Grant ("DG"), Downlink ("DL"), Demodulation Reference Signal ("DMRS"), Data Radio Bearer ("DRB"), Discontinuous Reception ("DRX"), Downlink Pilot Time Slot ("DwPTS"), Enhanced Clear Channel Assessment ("eCCA"), EPS Connection Management ("ECM"), Enhanced Mobile Broadband ("eMBB"), Evolved Node B ("eNB"), Effective Isotropic Radiated Power ("EIRP"), European Telecommunications Standards Institute ("ETSI"), Evolved Packet Core ("EPC"), Evolved Packet System ("EPS"), Evolved Universal Terrestrial Access ("E-UTRA"), Evolved Universal Terrestrial Access Network ("E-UTRAN"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), 5G Node B or Next Generation Node B ("gNB"), Group Leader ("GL"), General Packet Radio Services ("GPRS"), Guard Period ("GP"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Home PLMN ("HPLMN"), Home Subscriber Server ("HSS"), Identity or Identifier ("ID"), Information Element ("IE"), Industrial Internet-of-Things ("IIoT"), International Mobile Equipment Identity ("IMEI"), International Mobile Subscriber Identity ("IMSI"), International Mobile Telecommunications ("IMT"), Internet-of-Things ("IoT"), Intelligent Transportation Systems Application Identifier ("ITS-AID"), Key Performance Indicator ("KPI"), Layer 1 ("L1"), Layer 2 ("L2"), Layer 3 ("L3"), Licensed Assisted Access ("LAA"), Load Based Equipment ("LBE"), Listen-Before-Talk ("LBT"), Logical Channel ("LCH"), Logical Channel Prioritization ("LCP"), Log-Likelihood Ratio ("LLR"), Long Term Evolution ("LTE"), Multiple TRP ("M-TRP"), Multiple Access ("MA"), Medium Access Control ("MAC"), Multimedia Broadcast Multicast Services ("MBMS"), Minimum Communication Range ("MCR"), Modulation Coding Scheme ("MCS"), Master Information Block ("MIB"), Multiple Input Multiple Output ("MIMO"), Mobility Management ("MM"), Mobility Management Entity ("MME"), Mobile Network Operator ("MNO"), massive MTC ("mMTC"), Maximum Power Reduction ("MPR"), Machine Type Communication ("MTC"), Multi User Shared Access ("MUSA"), Non Access Stratum ("NAS"), Narrowband ("NB"), Negative-Acknowledgment or Non-Acknowledgment ("NACK") or ("NAK"), New Data Indicator ("NDI"), Network Entity ("NE"), Network Function ("NF"), Next Generation RAN ("NG-RAN"), Non-Orthogonal Multiple Access ("NOMA"), New Radio ("NR"), Network Repository Function ("NRF"), Network Slice Instance ("NSI"), Network Slice Selection Assistance Information ("NSSAI"), Network Slice Selection Function ("NSSF"), Network Slice Selection Policy ("NSSP"), Operation and Maintenance System ("OAM"), Orthogonal Frequency Division Multiplexing ("OFDM"), Orthogonal Frequency Division Multiple Access ("OFDMA"), Open-Loop ("OL"), Other System Information ("OSI"), Power Angular Spectrum ("PAS"), Physical Broadcast Channel ("PBCH"), Power Control ("PC"), LTE-to-V2X Interface ("PC5"), Primary Cell ("PCell"), Policy Control Function (""PCF"), Physical Cell ID ("PCID"), Physical Downlink Control Channel ("PDCCH"), Packet Data Convergence Protocol ("PDCP"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Platoon Leader ("PL"), Public Land Mobile Network ("PLMN"), Platoon Member ("PM"), Physical Random Access Channel ("PRACH"), Physical Resource Block ("PRB"), Primary Secondary Cell ("PSCell"), Physical Sidelink Control Channel ("PSCCH"), Physical Sidelink Feedback Channel ("PSFCH"), Provider Service Identifier ("PSID"), Physical Uplink Control Channel ("PUCCH"), Physical Uplink Shared Channel ("PUSCH"), Quasi Co-Located ("QCL"), Quality of Service ("QoS"), Quadrature Phase Shift Keying ("QPSK"), Registration Area ("RA"), Radio Access Network ("RAN"), Radio Access Technology ("RAT"), Random Access Procedure ("RACH"), Random Access Response ("RAR"), Resource Element Group ("REG"), Radio Link Control ("RLC"), Radio Link Monitoring ("RLM"), Radio Network Temporary Identifier ("RNTI"), Reference Signal ("RS"), Remaining Minimum System Information ("RMSI"), Radio Resource Control ("RRC"), Radio Resource Management ("RIM"), Resource Spread Multiple Access ("RSMA"), Reference Signal Received Power ("RSRP"), Round Trip Time ("RTT"), Receive ("RX"), Sparse Code Multiple Access ("SCMA"), Space Division Multiplexing ("SDM"), Scheduling Request ("SR"), Sounding Reference Signal ("SRS"), Single Carrier Frequency Division Multiple Access ("SC-FDMA"), Secondary Cell ("SCell"), Shared Channel ("SCH"), Sidelink Control Information ("SCI"), Sub-carrier Spacing ("SCS"), Service Data Unit ("SDU"), System Information Block ("SIB"), SystemInformationBlockType1 ("SIB1"), SystemInformationBlockType2 ("SIB2"), Subscriber Identity/Identification Module ("SIM"), Signal-to-Interference-Plus-Noise Ratio ("SINR"), Sidelink ("SL"), Service Level Agreement ("SLA"), Sidelink Slot Format Indicator ("SL- SFI"), Session Management Function ("SMF"), Special Cell ("SpCell"), Single Network Slice Selection Assistance Information ("S-NSSAI"), Shortened TTI ("sTTI"), Semi-Persistent Scheduling ("SPS"), Sidelink RSRP ("S-RSRP"), Synchronization Signal ("SS"), Synchronization Signal Block ("SSB"), Survival Time ("ST"), Scheduling UE ("SUE"), Supplementary Uplink ("SUL"), Subscriber Permanent Identifier ("SUPI"), Candidate Resource Selection Time Window ("T2"), Tracking Area ("TA"), TA Indicator ("TAI"), Transport Block ("TB"), Transport Block Size ("TB S"), Transmission Configuration Indicator ("TCI"), Time-Division Duplex ("TDD"), Time Division Multiplexing ("TDM"), Time Division Orthogonal Cover Code ("TD-OCC"), Time Division Resource Allocation ("TDRA"), Transmission Power Control ("TPC"), Transmission and Reception Point ("TRP"), Time Sensitive Communication ("TSC"), Time Sensitive Communication Assistance Information ("TSCAI"), Transmission Time Interval ("TTI"), Time to Live ("TTL"), Transmit ("TX"), Uplink Control Information ("UCI"), Unified Data Management Function ("UDM"), Unified Data Repository ("UDR"), User Entity/Equipment (Mobile Terminal) ("UE"), Universal Integrated Circuit Card ("UICC"), Uplink ("UL"), Universal Mobile Telecommunications System ("UMTS"), User Plane ("UP"), Uplink Pilot Time Slot ("UpPTS"), Ultra-reliability and Low-latency Communications ("URLLC"), UE Route Selection Policy ("URSP"), LTE Radio Interface ("Uu"), Vehicle-To-Everything ("V2X"), Visiting AMF ("vAMF"), Visiting NSSF ("vNSSF"), Visiting PLMN ("VPLMN"), Interconnecting Interface ("X2") ("Xn"), and Worldwide Interoperability for Microwave Access ("WiMAX").

In certain wireless communications networks, feedback may be used. In such networks, feedback may not take into account survival time as a QoS requirement.

BRIEF SUMMARY

Methods for consecutive data packet feedback are disclosed. Apparatuses and systems also perform the functions of the method. One embodiment of a method includes receiving a first set of consecutive data packets. In certain embodiments, the method includes transmitting feedback corresponding to the first set of consecutive data packets, wherein the feedback comprises: an error indication in response each data packet in the first set of consecutive data packets failing to be received correctly; a non-error indication in response to at least one data packet in the first set of consecutive data packets being received correctly; a counter value that indicates a consecutive number of data packet failures; or some combination thereof.

One apparatus for consecutive data packet feedback includes a receiver that receives a first set of consecutive data packets. In some embodiments, the apparatus includes a transmitter that transmits feedback corresponding to the first set of consecutive data packets, wherein the feedback comprises: an error indication in response each data packet in the first set of consecutive data packets failing to be received correctly; a non-error indication in response to at least one data packet in the first set of consecutive data packets being received correctly; a counter value that indicates a consecutive number of data packet failures; or some combination thereof.

One embodiment of a method for consecutive data packet feedback includes configuring a first plurality of uplink data packets consecutively. In certain embodiments, the method includes counting a number of consecutive data packets of the first plurality of uplink data packets lost from a user equipment. In some embodiments, the method includes, in response to the number of consecutive data packets reaching a predetermined threshold, configuring repetition of subsequent uplink data packets transmitted from the user equipment.

One apparatus for consecutive data packet feedback includes a processor that: configures a first plurality of uplink data packets consecutively; counts a number of consecutive data packets of the first plurality of uplink data packets lost from a user equipment; and, in response to the number of consecutive data packets reaching a predetermined threshold, configures repetition of subsequent uplink data packets transmitted from the user equipment.

One embodiment of a method for consecutive data packet feedback includes configuring a first plurality of data packets to be transmitted consecutively. In certain embodiments, the method includes determining a number of consecutive data packets of the first plurality of data packets lost. In some embodiments, the method includes, in response to the number of consecutive data packets being less than a predetermined threshold, reducing a number of subsequent data packets to be transmitted consecutively.

One apparatus for consecutive data packet feedback includes a processor that: configures a first plurality of data packets to be transmitted consecutively; determines a number of consecutive data packets of the first plurality of data packets lost; and, in response to the number of consecutive data packets being less than a predetermined threshold, reduces a number of subsequent data packets to be transmitted consecutively.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
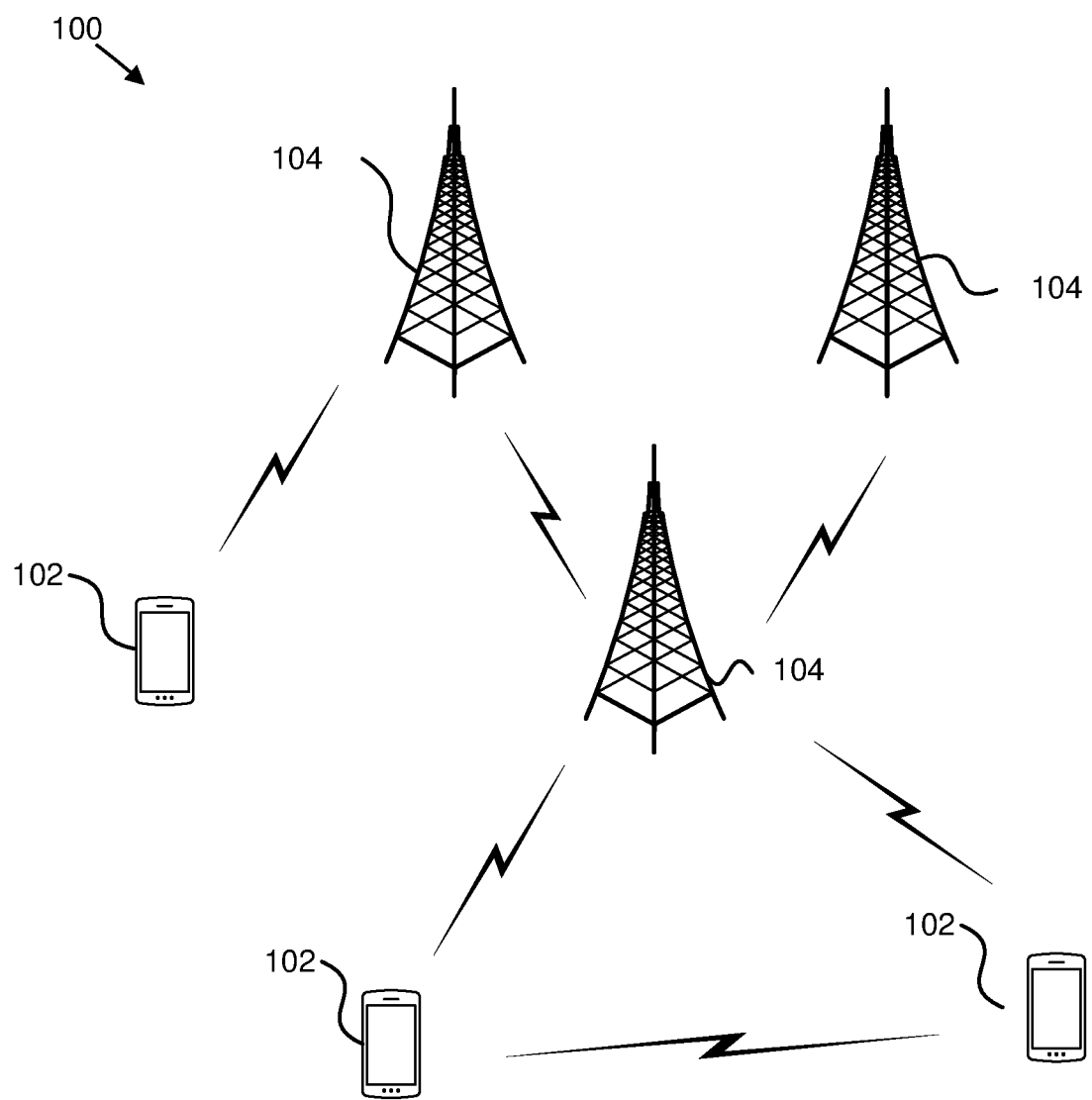
FIG. 1 is a schematic block diagram illustrating one embodiment of a wireless communication system for consecutive data packet feedback.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for consecutive data packet feedback. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. The remote units 102 may also communicate directly with one or more of the other remote units 102.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In one embodiment, a remote unit 102 may receive a first set of consecutive data packets. In certain embodiments, the remote unit 102 may transmit feedback corresponding to the first set of consecutive data packets, wherein the feedback comprises: an error indication in response each data packet in the first set of consecutive data packets failing to be received correctly; a non-error indication in response to at least one data packet in the first set of consecutive data packets being received correctly; a counter value that indicates a consecutive number of data packet failures; or some combination thereof. Accordingly, the remote unit 102 may be used for consecutive data packet feedback.

In another embodiment, a network unit 104 may configure a first plurality of uplink data packets consecutively. In certain embodiments, the network unit 104 may count a number of consecutive data packets of the first plurality of uplink data packets lost from a user equipment. In some embodiments, the network unit 104 may, in response to the number of consecutive data packets reaching a predetermined threshold, configure repetition of subsequent uplink data packets transmitted from the user equipment. Accordingly, the network unit 104 may be used for consecutive data packet feedback.

In one embodiment, a remote unit 102 and/or a network unit 104 may configure a first plurality of data packets to be transmitted consecutively. In certain embodiments, the remote unit 102 and/or the network unit 104 may determine a number of consecutive data packets of the first plurality of data packets lost. In some embodiments, the remote unit 102 and/or the network unit 104 may, in response to the number of consecutive data packets being less than a predetermined threshold, reduce a number of subsequent data packets to be transmitted consecutively. Accordingly, the remote unit 102 and/or the network unit 104 may be used for consecutive data packet feedback.

Figure 2:
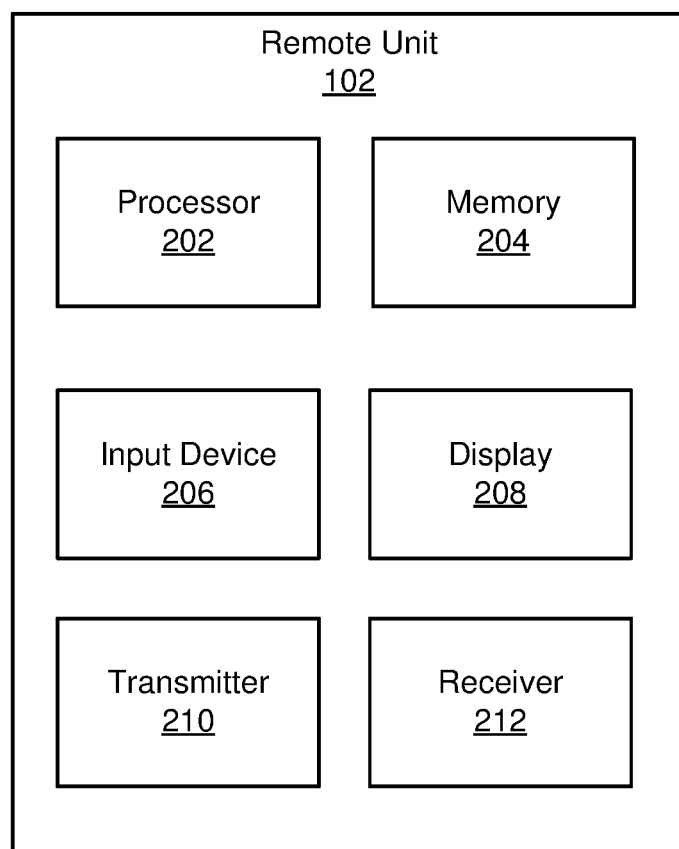
FIG. 2 is a schematic block diagram illustrating one embodiment of an apparatus that may be used for consecutive data packet feedback.

FIG. 2 depicts one embodiment of an apparatus 200 that may be used for consecutive data packet feedback. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202: configures a first plurality of data packets to be transmitted consecutively; determines a number of consecutive data packets of the first plurality of data packets lost; and, in response to the number of consecutive data packets being less than a predetermined threshold, reduces a number of subsequent data packets to be transmitted consecutively. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein. In some embodiments, the receiver 212 receives a first set of consecutive data packets. In some embodiments, the transmitter 210 transmits feedback corresponding to the first set of consecutive data packets, wherein the feedback comprises: an error indication in response each data packet in the first set of consecutive data packets failing to be received correctly; a non-error indication in response to at least one data packet in the first set of consecutive data packets being received correctly; a counter value that indicates a consecutive number of data packet failures; or some combination thereof.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
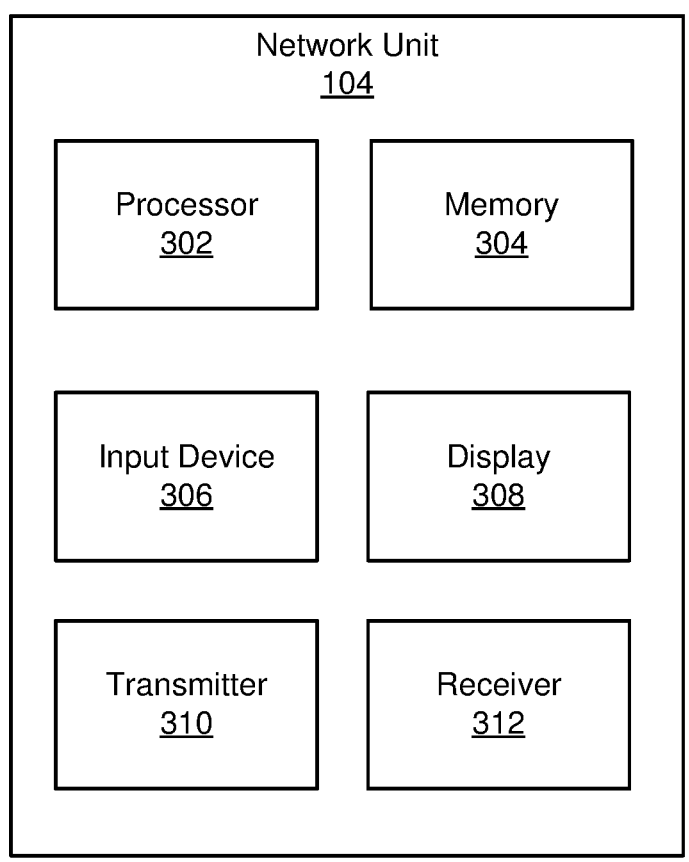
FIG. 3 is a schematic block diagram illustrating another embodiment of an apparatus that may be used for consecutive data packet feedback.

FIG. 3 depicts one embodiment of an apparatus 300 that may be used for consecutive data packet feedback. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the processor 302: configures a first plurality of uplink data packets consecutively; counts a number of consecutive data packets of the first plurality of uplink data packets lost from a user equipment; and, in response to the number of consecutive data packets reaching a predetermined threshold, configures repetition of subsequent uplink data packets transmitted from the user equipment.

In various embodiments, the processor 302: configures a first plurality of data packets to be transmitted consecutively; determines a number of consecutive data packets of the first plurality of data packets lost; and, in response to the number of consecutive data packets being less than a predetermined threshold, reduces a number of subsequent data packets to be transmitted consecutively. Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Certain configurations, such as 5G networks, may be adopted for connectivity and wireless automation in a factory floor in which a variety of machines, robots, actuators, and terminals may communicate and serve different applications such as control-to-control communication, motion control, mobile control panels, mobile robots, and/or process automation applications. Some of these applications may have strict performance KPIs and service requirements in terms of end-to-end latency, reliability, cycle time, ST, and so forth. ST may indicate a time that an application consuming a communication service may continue without an anticipated message. For cyclic traffic, ST may be defined as a maximum number of consecutive incorrectly received or lost messages or in terms of loss tolerance. Once a message is not successfully delivered, the loss of the next messages within an ST is tolerable. For many stringent IIoT use cases, the ST is equal to the cycle time, which means only the loss of one message can be tolerated. However, the ST may span several messages for other use cases. Accordingly, in certain embodiments that have ST as a QoS requirement, loss of every data packet may not be equally crucial for maintaining an uninterrupted flow of an application.

Loss tolerance may relax performance requirements in terms of reliability and in relation to a service availability that indicates whether a system is ready for use at a given time or is unavailable. Therefore, ST>=a transfer interval may lead to an available service despite the unavailability of the communication. In some embodiments, survival time may be managed outside a RAN (e.g., by a CN); however, considering very short reaction times of most stringent IIoT use cases, CN or application-based handling of survival time may be impractical.

In some embodiments, if survival time is considered a QoS requirement in RAN, then a high-resolution feedback may be used (e.g., a single feedback—implicit or explicit—may be sent after a number of consecutive data packets) if a number of consecutive data packets lost is within a loss tolerance and the feedback may report whether all data packets within a burst are in error (e.g., "NACK" or "0" bit) or at least one of the data packets is successfully received and therefore not in error (e.g., "ACK" or "1" bit).

In such embodiments, before the loss tolerance is reached, a number of points (e.g., after transmission of every N packets) at which the feedback is sent may be either dynamically configured by a network or semi-statically configured. The feedback interval may either be the same or vary depending up on feedback scheduling. One example is shown in FIG. 4 in which the loss tolerance is 10 data packets and feedback is scheduled after every 3 packets.

Figure 4:
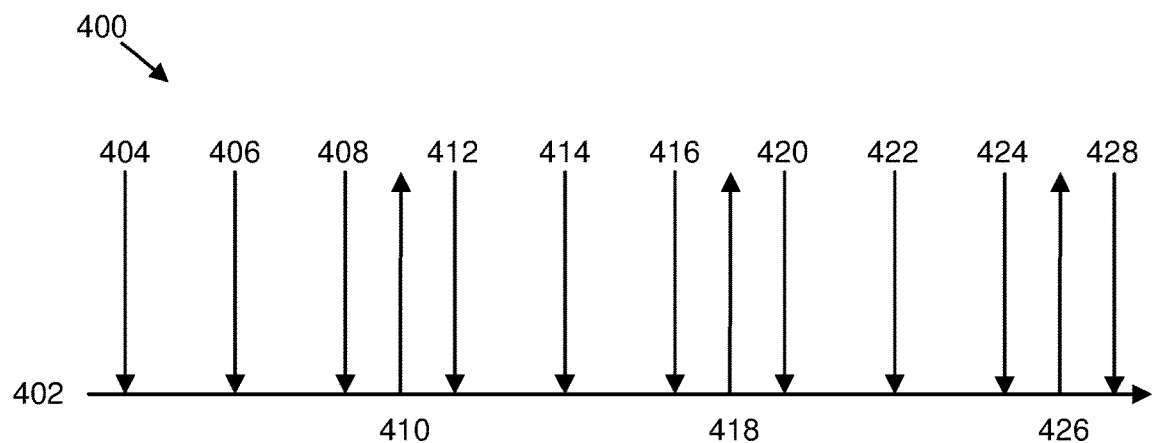
FIG. 4 is a timing diagram illustrating one embodiment of high-resolution feedback having a fixed interval.

Specifically, FIG. 4 is a timing diagram 400 illustrating one embodiment of high-resolution feedback having a fixed interval. The timing diagram 400 is illustrated over time 402. At a first time 404 a first DL data packet P1 is received correctly, at a second time 406 a second DL data packet P2 is not received correctly, at a third time 408 a third DL data packet P3 is not received correctly, and at a fourth time 410 an UL ACK is transmitted because at least one of data packets P1, P2, and P3 was received correctly. Moreover, at a fifth time 412 a fourth DL data packet P4 is not received correctly, at a sixth time 414 a fifth DL data packet P5 is not received correctly, at a seventh time 416 a sixth DL data packet P6 is not received correctly, and at an eighth time 418 an UL NACK is transmitted because all of the data packets P4, P5, and P6 were not received correctly. Furthermore, at a ninth time 420 a seventh DL data packet P7 is not received correctly, at a tenth time 422 an eighth DL data packet P8 is not received correctly, at an eleventh time 424 a ninth DL data packet P9 is received correctly, and at a twelfth time 426 an UL ACK is transmitted because at least one of data packets P7, P8, and P9 was received correctly. At a thirteenth time 428 a tenth DL data packet P10 is not received correctly. Thus, loss tolerance can be monitored by reporting after every three DL data packets instead of after every DL data packet, thereby reducing feedback resources used.

Figure 5:
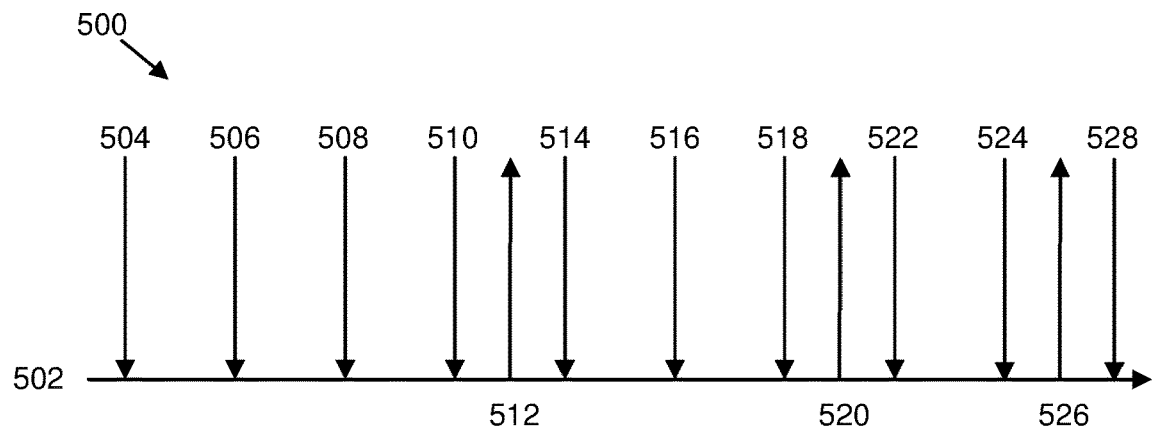
FIG. 5 is a timing diagram illustrating one embodiment of high-resolution feedback having a variable interval.

Another example of a feedback interval in shown in FIG. 5 in which the loss tolerance is 10 data packets and the feedback is scheduled at irregular intervals (e.g., first feedback after the first 4 data packets, then second feedback after 3 subsequent data packets, and third feedback after 2 subsequent data packets).

Specifically, FIG. 5 is a timing diagram 500 illustrating one embodiment of high-resolution feedback having a variable interval. The timing diagram 500 is illustrated over time 502. At a first time 504 a first DL data packet P1 is received correctly, at a second time 506 a second DL data packet P2 is not received correctly, at a third time 508 a third DL data packet P3 is not received correctly, at a fourth time 510 a fourth DL data packet P4 is not received correctly, and at a fifth time 512 an UL ACK is transmitted because at least one of data packets P1, P2, P3, and P4 was received correctly. Moreover, at a sixth time 514 a fifth DL data packet P5 is not received correctly, at a seventh time 516 a sixth DL data packet P6 is not received correctly, at an eighth time 518 a seventh DL data packet P7 is not received correctly, and at a ninth time 520 an UL NACK is transmitted because all of the data packets P5, P6, and P7 were not received correctly. Furthermore, at a tenth time 522 an eighth DL data packet P8 is not received correctly, at an eleventh time 524 a ninth DL data packet P9 is received correctly, and at a twelfth time 526 an UL ACK is transmitted because at least one of data packets P8 and P9 was received correctly. At a thirteenth time 528 a tenth DL data packet P10 is not received correctly. Thus, loss tolerance can be monitored by reporting after an interval of DL data packets instead of after every DL data packet, thereby reducing feedback resources used.

As may be appreciated, regarding the embodiments described in relation to FIG. 4 and FIG. 5, feedback signaling is reduced and power consumed may also be reduced.

In some embodiments, if survival time is a QoS requirement in RAN, then feedback may be enhanced so that a receiver reports a counter to a transmitter. In such embodiments, a number of consecutive data packets lost to be reported may be within a loss tolerance and the counter may indicate a last consecutive number of packets lost.

Figure 6:
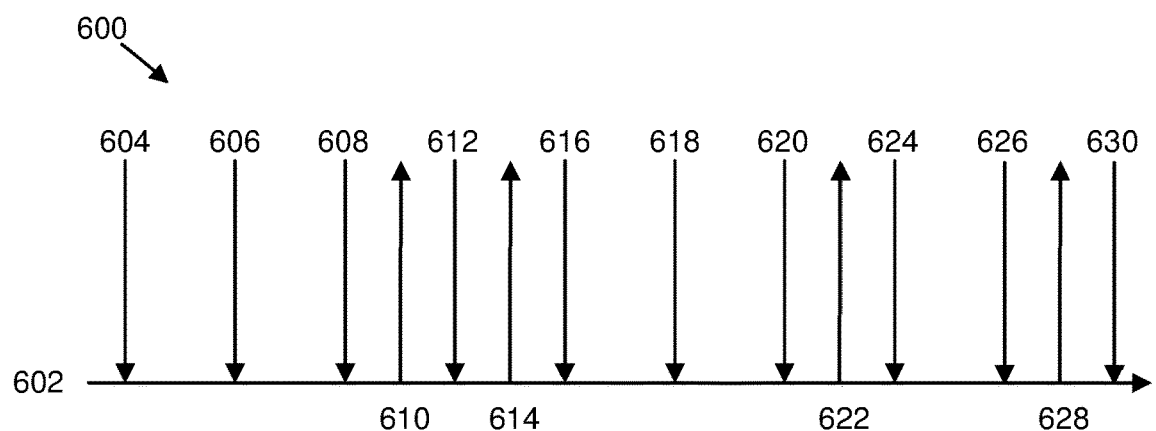
FIG. 6 is a timing diagram illustrating one embodiment of dynamically adjusted high-resolution feedback.

In certain embodiments, before a loss tolerance is reached, a number of points (e.g., after transmission of every N packets) at which feedback is sent may be either dynamically configured by a network or semi-statically configured. The feedback interval may either be the same or may vary depending up on feedback scheduling. The feedback includes a number of last consecutive data packets loss so that the transmitter may use this information to avoid reaching the loss tolerance by scheduling more frequent feedback for subsequent data packets. In such embodiments, dynamic configuration may be used. FIG. 6 illustrates one example in which the loss tolerance is 5 data packets.

Specifically, FIG. 6 is a timing diagram 600 illustrating one embodiment of dynamically adjusted high-resolution feedback. The timing diagram 600 is illustrated over time 602. At a first time 604 a first DL data packet P1 is received correctly and a counter that indicates a last consecutive number of packets lost is zero, at a second time 606 a second DL data packet P2 is not received correctly and the counter increments to one, at a third time 608 a third DL data packet P3 is not received correctly and the counter increments to two, at a fourth time 610 the counter value of two is transmitted because that is the last consecutive number of packets lost. Moreover, at a fifth time 612 a fourth DL data packet P4 is received correctly so the counter is reset to zero, and at a sixth time 614 the counter value of zero is transmitted because that is the last consecutive number of packets lost. At a seventh time 616 a fifth DL data packet P5 is received correctly so the counter stays at zero, at an eighth time 618 a sixth DL data packet P6 is received correctly so the counter stays at zero, at a ninth time 620 a seventh DL data packet P7 is not received correctly so the counter increments to one, and at a tenth time 622 the counter value of one is transmitted because that is the last consecutive number of packets lost. Furthermore, at an eleventh time 624 an eighth DL data packet P8 is not received correctly so the counter increments to two, at a twelfth time 626 a ninth DL data packet P9 is received correctly so the counter resets to zero, and at a thirteenth time 628 the counter value of zero is transmitted because that is the last consecutive number of packets lost. At a fourteenth time 630 a tenth DL data packet P10 is received correctly so the counter stays at zero. Thus, loss tolerance can be monitored by reporting after an interval of DL data packets instead of after every DL data packet, thereby reducing feedback resources used.

As illustrated in FIG. 6, the first feedback is scheduled after the first 3 data packets. As explained above, the first data packet was a success, but the second and third data packets were failures, so the receiver reported a counter value of 2. Based on this, the transmitter knows that if there are 3 more continuous data packets lost, then the application will go to downtime. Therefore, the transmitter may use this information and schedule the next feedback before that, which is after 1 subsequent data packet. Now this data packet (data packet 4) was a success and so the receiver sends back the counter value 0 that means now the loss tolerance is avoided, the counter is reset, and the transmitted may again have a coarse feedback (e.g., after the next 3 data packets) as shown.

In embodiments such as found in FIG. 6, additional information is reported back to a transmitter via a counter, and the transmitter may use this information to more efficiently schedule feedback and/or other transmissions.

In various embodiments, if survival time is a QoS requirement in a RAN and a loss tolerance is approaching, then a reliability of scheduling DCI, transmission of packets, and/or transmission of feedback may be increased by adaptively increasing a higher number of repetitions and/or retransmissions in comparison to a last burst of transmission.

In some embodiments, when and how to configure repetitions and/or retransmissions for efficient resource scheduling may be determined based on feedback. In such embodiments, as the loss tolerance approaches due to an increasing number of consecutive lost data packets, a number of repetitions and/or retransmissions may be increased to have more robust transmissions and avoid further failures. Such embodiments may facilitate resource efficient repetitions and/or retransmission depending upon a closeness of a number of consecutive lost data packets to a loss tolerance. As may be appreciated, embodiments described herein may be individually applied or applied in combination.

In certain embodiments, if multiple DL packets are transmitted from multiple TRPs to a UE, and if a number of consecutive data packets lost reaches a certain threshold, then repetition may be applied to subsequent data packets from multiple TRPs.

In one embodiment, a gNB schedules consecutive new DL packets of a radio bearer from multiple TRPs to a UE in which one UL feedback resource is configured for joint and/or single feedback to be transmitted to a primary TRP or one of the TRPs for multiple DL packets.

Figure 7:
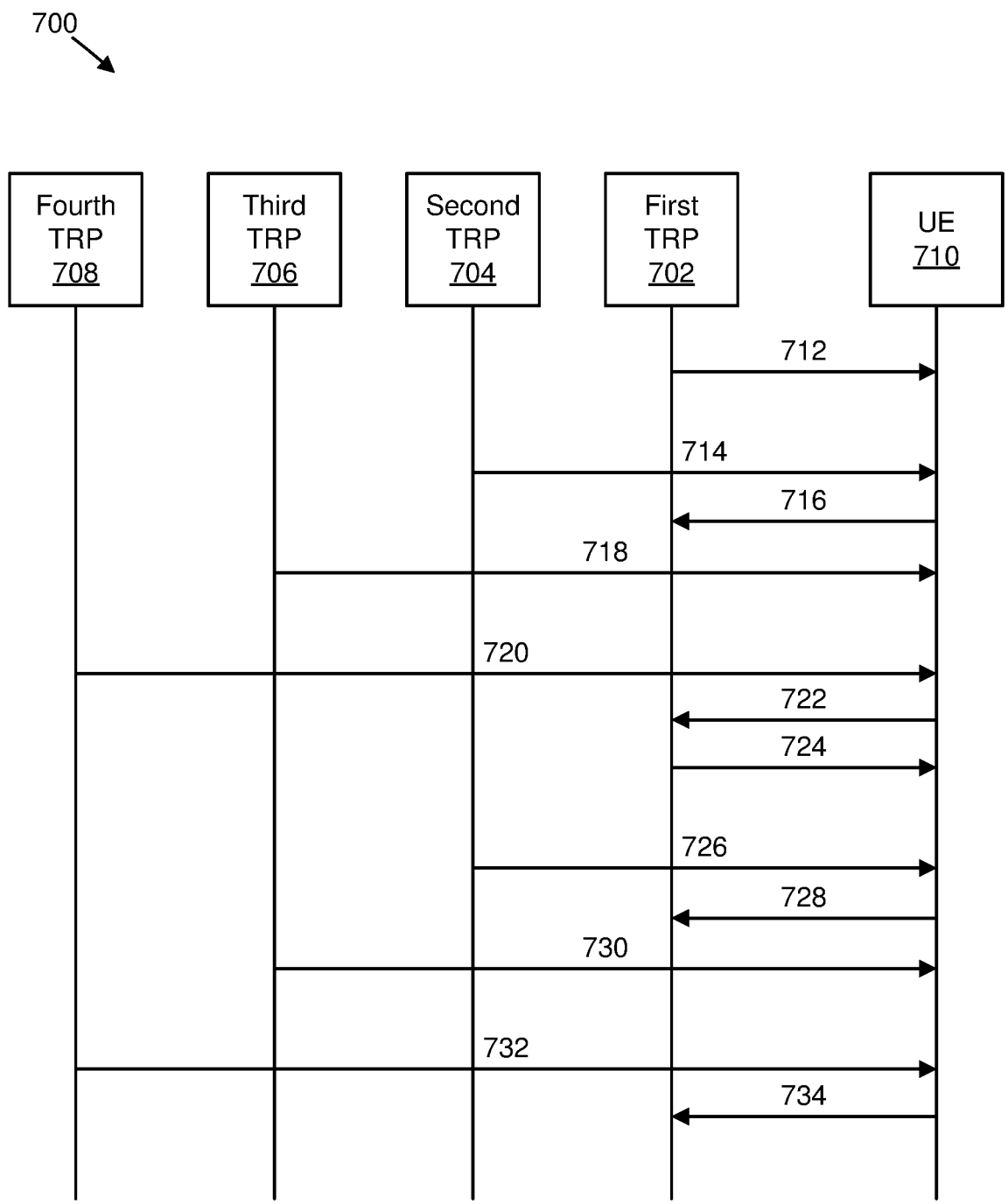
FIG. 7 is a communication diagram illustrating one embodiment of communications in which multiple TRPs transmit consecutive DL packets.

One implementation of this embodiment is illustrated in FIG. 7 in which each TRP transmits different DL packet to a UE and a number of TRPs configured depends on a loss tolerance.

Specifically, FIG. 7 is a communication diagram 700 illustrating one embodiment of communications in which multiple TRPs transmit consecutive DL packets. The communications 700 may include communications between a first TRP 702, a second TRP 704, a third TRP 706, a fourth TRP 708, and a UE 710. As may be appreciated, descriptions of communications 700 contained herein may refer to one or more messages transmitted between devices.

In one embodiment, in a first communication 712 transmitted from the first TRP 702 to the UE 710, the first TRP 702 may transmit a first data packet to the UE 710. In some embodiments, in a second communication 714 transmitted from the second TRP 704 to the UE 710, the second TRP 704 may transmit a second data packet to the UE 710. In various embodiments, in a third communication 716 transmitted from the UE 710 to the first TRP 702, the UE 710 may transmit a low-resolution feedback to the first TRP 702. The first TRP 702 may be configured as a primary TRP that receives all feedback messages from the UE 716.

In certain embodiments, in a fourth communication 718 transmitted from the third TRP 706 to the UE 710, the third TRP 706 may transmit a third data packet to the UE 710. In some embodiments, in a fifth communication 720 transmitted from the fourth TRP 708 to the UE 710, the fourth TRP 708 may transmit a fourth data packet to the UE 710. In various embodiments, in a sixth communication 722 transmitted from the UE 710 to the first TRP 702, the UE 710 may transmit a low-resolution feedback to the first TRP 702.

In one embodiment, in a seventh communication 724 transmitted from the first TRP 702 to the UE 710, the first TRP 702 may transmit a fifth data packet to the UE 710. In some embodiments, in an eighth communication 726 transmitted from the second TRP 704 to the UE 710, the second TRP 704 may transmit a sixth data packet to the UE 710. In various embodiments, in a ninth communication 728 transmitted from the UE 710 to the first TRP 702, the UE 710 may transmit a low-resolution feedback to the first TRP 702.

In certain embodiments, in a tenth communication 730 transmitted from the third TRP 706 to the UE 710, the third TRP 706 may transmit a seventh data packet to the UE 710. In some embodiments, in an eleventh communication 732 transmitted from the fourth TRP 708 to the UE 710, the fourth TRP 708 may transmit an eighth data packet to the UE 710. In various embodiments, in a twelfth communication 734 transmitted from the UE 710 to the first TRP 702, the UE 710 may transmit a low-resolution feedback to the first TRP 702.

As may be appreciated, the feedback resource used for the low-resolution feedback may not necessarily be related to L1 HARQ feedback or a request for retransmission, but the feedback resource may be related to an error state or downtime of a communication system after failing to receive n consecutive DL packets.

In certain embodiments, each feedback resource is configured after n DL packets wherein n<loss tolerance. The feedback resource may be an L1 feedback that may be periodically configured in PUCCH, L2 feedback as part of a MAC CE, L3 feedback as part of RLC, or a PDCP status report.

In some embodiments, a repetition may be dynamically configured or semi-statically configured repetitions may be activated after a number of consecutive lost data packets reaches a certain threshold.

In various embodiments, a primary TRP may be defined or assumed by a UE as follows: 1) for single DCI based M-TRP operation, a TRP associated with transmission of DCI may be the primary TRP (e.g., by associating DCI with a CORESETPOOLIndex and with TRP (e.g., TCI state)); 2) for multi DCI based M-TRP operation and joint feedback, the primary TRP may be defined as one that is associated with the CORESETPOOLIndex that has CORESET with a DCI having PUCCH resources (and related parameters such as DAI) for joint feedback transmission; and/or 3) the primary TRP may be assumed to be the TRP associated with a first TCI state that is indicated in the DCI.

In the feedback resource, the UE 710 reports a '0' or 'no error' if one of n data packets was correctly received and reports '1' or 'error' if all n data packets were lost. Upon receiving the feedback '1' or error from the UE 710, the first TRP 702 may configure repetitions for an $(n+1)^{th}$ DL data packet from multiple TRPs to enhance the reliability as shown in FIG. 8.

Figure 8:
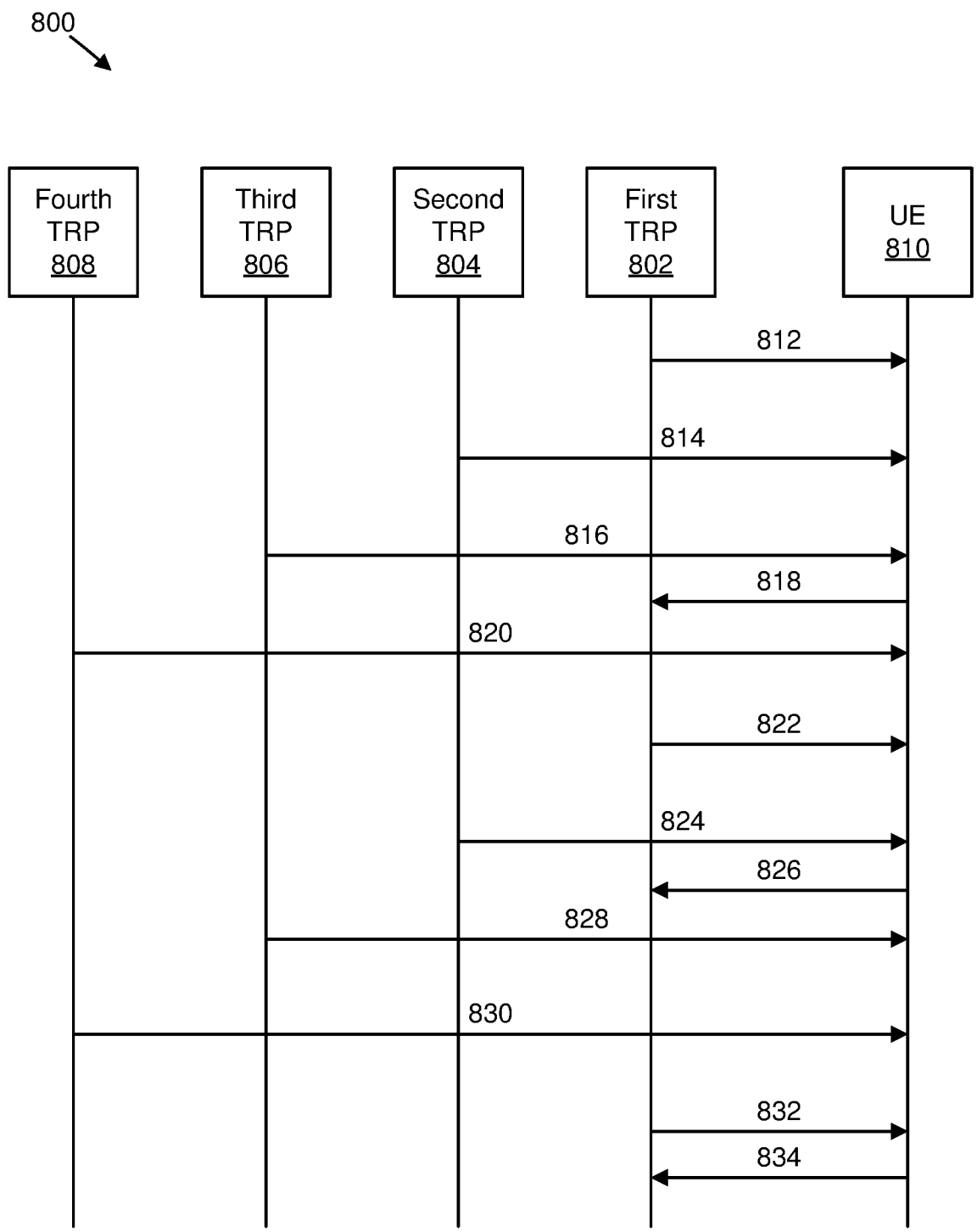
FIG. 8 is a communication diagram illustrating one embodiment of communications in which packet repetition is used in response to a feedback error.

Specifically, FIG. 8 is a communication diagram illustrating one embodiment of communications 800 in which packet repetition is used in response to a feedback error. The communications 800 may include communications between a first TRP 802, a second TRP 804, a third TRP 806, a fourth TRP 808, and a UE 810. As may be appreciated, descriptions of communications 800 contained herein may refer to one or more messages transmitted between devices.

In one embodiment, in a first communication 812 transmitted from the first TRP 802 to the UE 810, the first TRP 802 may transmit a first data packet to the UE 810 that the UE 810 does not successfully receive. In some embodiments, in a second communication 814 transmitted from the second TRP 804 to the UE 810, the second TRP 804 may transmit a second data packet to the UE 810 that the UE 810 does not successfully receive. In various embodiments, in a third communication 816 transmitted from the third TRP 806 to the UE 810, the third TRP 806 may transmit a third data packet to the UE 810 that the UE 810 does not successfully receive. In certain embodiments, in a fourth communication 818 transmitted from the UE 810 to the first TRP 802, the UE 810 may transmit a low-resolution feedback to the first TRP 802. The first TRP 802 may be configured as a primary TRP that receives all feedback messages from the UE 816. The low-resolution feedback may indicate a '1' or an error because the UE 810 did not receive any of the first, second, and third data packets correctly.

In some embodiments, in response to the error indication, in a fifth communication 820 transmitted (e.g., concurrently and/or simultaneously) from the first TRP 802, the second TRP 804, the third TRP 806, and the fourth TRP 808 to the UE 810, the first TRP 802, the second TRP 804, the third TRP 806, and the fourth TRP 808 may transmit a fourth data packet to the UE 810 from the multiple TRPs to facilitate redundancy and a high likelihood that that data packet is received correctly. In this embodiment, at least one repetition of the data packet is received correctly. In various embodiments, in a sixth communication 822 transmitted from the first TRP 802 to the UE 810, the first TRP 802 may transmit a fifth data packet to the UE 810 that the UE 810 successfully receives. In one embodiment, in a seventh communication 824 transmitted from the second TRP 804 to the UE 810, the second TRP 804 may transmit a sixth data packet to the UE 810 that the UE 810 successfully receives. In some embodiments, in an eighth communication 826 transmitted from the UE 810 to the first TRP 802, the UE 810 may transmit a low-resolution feedback to the first TRP 802. The low-resolution feedback may indicate a '0' or no error because the UE 810 received at least one of the fourth, fifth, and sixth data packets correctly.

In various embodiments, in a ninth communication 828 transmitted from the third TRP 806 to the UE 810, the third TRP 806 may transmit a seventh data packet to the UE 810 that the UE 810 successfully receives. In certain embodiments, in a tenth communication 830 transmitted from the fourth TRP 808 to the UE 810, the fourth TRP 808 may transmit an eighth data packet to the UE 810 that the UE 810 does not successfully receive. In some embodiments, in an eleventh communication 832 transmitted from the first TRP 802 to the UE 810, the first TRP 802 may transmit a ninth data packet to the UE 810 that the UE 810 successfully receives. In various embodiments, in a twelfth communication 834 transmitted from the UE 810 to the first TRP 802, the UE 810 may transmit a low-resolution feedback to the first TRP 802. The low-resolution feedback may indicate a '0' or no error because the UE 810 received at least one of the seventh, eighth, and ninth data packets correctly.

In certain embodiments, a gNB may derive an error state based only on ACK/NACK of n consecutive data packets. If HARQ is configured, the gNB may declare an error state after consuming all HARQ retransmissions for the n packets, as shown in FIG. 9.

Figure 9:
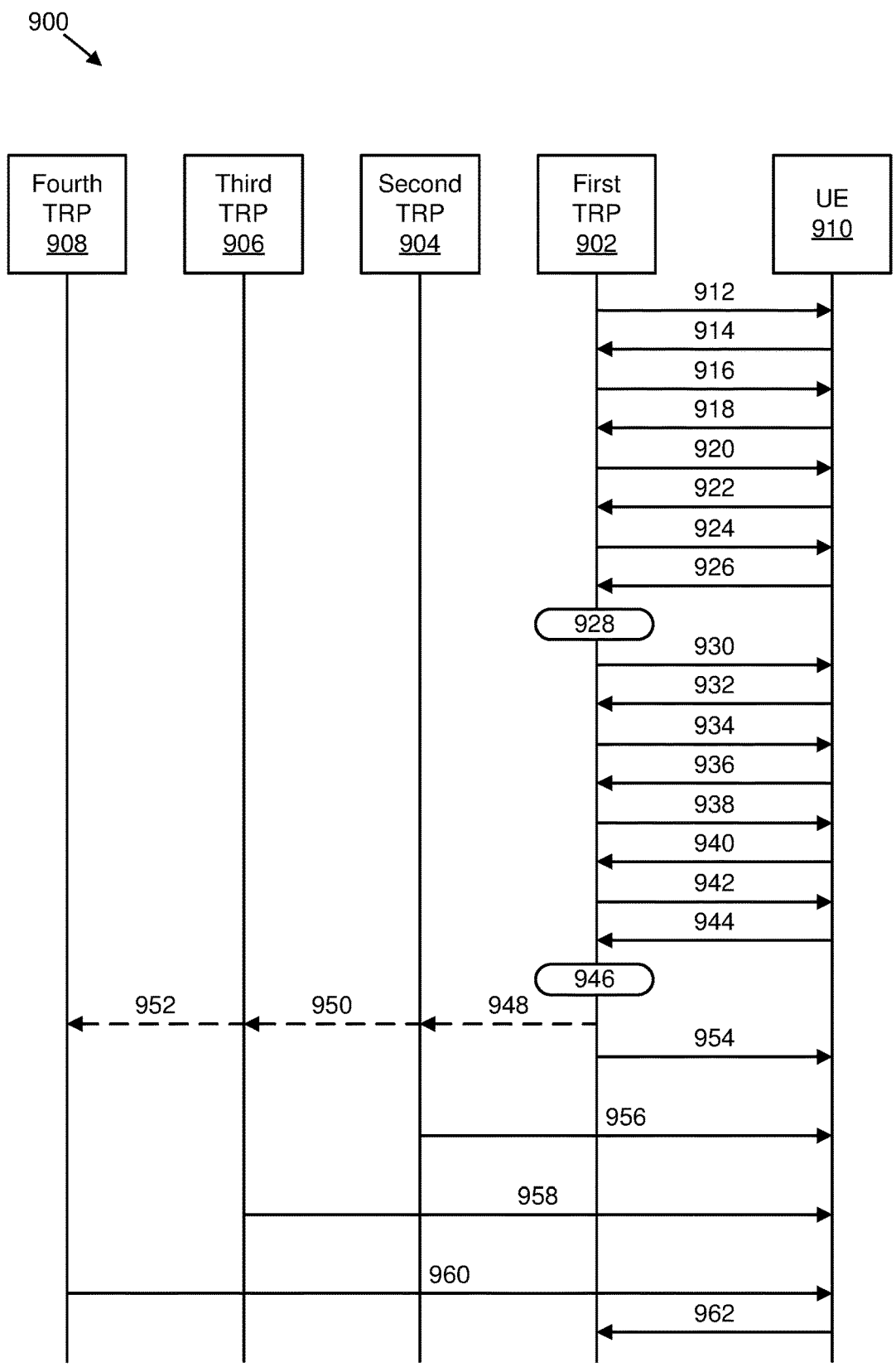
FIG. 9 is a communication diagram illustrating one embodiment of communications including error state extraction based on HARQ.

Specifically, FIG. 9 is a communication diagram illustrating one embodiment of communications 900 including error state extraction based on HARQ. The communications 900 may include communications between a first TRP 902, a second TRP 904, a third TRP 906, a fourth TRP 908, and a UE 910. As may be appreciated, descriptions of communications 900 contained herein may refer to one or more messages transmitted between devices.

In one embodiment, in a first communication 912 transmitted from the first TRP 902 to the UE 910, the first TRP 902 may transmit a first data packet to the UE 910. In some embodiments, in a second communication 914 transmitted from the UE 910 to the first TRP 902, the UE 910 may transmit ACK/NACK to indicate whether the data packet was received correctly. The first TRP 902 may be configured as a primary TRP that receives all feedback messages from the UE 916. In this example, the UE 910 transmits NACK to indicate that the data packet was not received correctly. In various embodiments, in a third communication 916 transmitted from the first TRP 902 to the UE 910, the first TRP 902 may also transmit the first data packet to the UE 910. In certain embodiments, in a fourth communication 918 transmitted from the UE 910 to the first TRP 902, the UE 910 may transmit ACK/NACK to indicate whether the data packet was received correctly. In this example, the UE 910 transmits NACK to indicate that the data packet was not received correctly.

In one embodiment, in a fifth communication 920 transmitted from the first TRP 902 to the UE 910, the first TRP 902 may also transmit the first data packet to the UE 910. In some embodiments, in a sixth communication 922 transmitted from the UE 910 to the first TRP 902, the UE 910 may transmit ACK/NACK to indicate whether the data packet was received correctly. In this example, the UE 910 transmits NACK to indicate that the data packet was not received correctly. In various embodiments, in a seventh communication 924 transmitted from the first TRP 902 to the UE 910, the first TRP 902 may also transmit the first data packet to the UE 910. In certain embodiments, in an eighth communication 926 transmitted from the UE 910 to the first TRP 902, the UE 910 may transmit ACK/NACK to indicate whether the data packet was received correctly. In this example, the UE 910 transmits NACK to indicate that the data packet was not received correctly. The first TRP 902 may determine 928 a number of consecutive data packets lost and compare this to a number n. For this example, n=8 and the number of consecutive data packets lost is 4, so no change in action is made.

In one embodiment, in a ninth communication 930 transmitted from the first TRP 902 to the UE 910, the first TRP 902 may transmit a second data packet to the UE 910. In some embodiments, in a tenth communication 932 transmitted from the UE 910 to the first TRP 902, the UE 910 may transmit ACK/NACK to indicate whether the data packet was received correctly. In this example, the UE 910 transmits NACK to indicate that the data packet was not received correctly. In various embodiments, in an eleventh communication 934 transmitted from the first TRP 902 to the UE 910, the first TRP 902 may also transmit the second data packet to the UE 910. In certain embodiments, in a twelfth communication 936 transmitted from the UE 910 to the first TRP 902, the UE 910 may transmit ACK/NACK to indicate whether the data packet was received correctly. In this example, the UE 910 transmits NACK to indicate that the data packet was not received correctly.

In one embodiment, in a thirteenth communication 938 transmitted from the first TRP 902 to the UE 910, the first TRP 902 may also transmit the second data packet to the UE 910. In some embodiments, in a fourteenth communication 940 transmitted from the UE 910 to the first TRP 902, the UE 910 may transmit ACK/NACK to indicate whether the data packet was received correctly. In this example, the UE 910 transmits NACK to indicate that the data packet was not received correctly. In various embodiments, in a fifteenth communication 942 transmitted from the first TRP 902 to the UE 910, the first TRP 902 may also transmit the second data packet to the UE 910. In certain embodiments, in a sixteenth communication 944 transmitted from the UE 910 to the first TRP 902, the UE 910 may transmit ACK/NACK to indicate whether the data packet was received correctly. In this example, the UE 910 transmits NACK to indicate that the data packet was not received correctly. The first TRP 902 may determine 946 a number of consecutive data packets lost and compare this to a number n. For this example, n=8 and the number of consecutive data packets lost is 8, so the first TRP triggers an error state. In a seventeenth communication 948, the first TRP 902 indicates the error state to the second TRP 904 so that the following data packets are transmitted from different TRPs. In an eighteenth communication 950, the first TRP 902 indicates the error state to the third TRP 906 so that the following data packets are transmitted from different TRPs. In a nineteenth communication 952, the first TRP 902 indicates the error state to the fourth TRP 908 so that the following data packets are transmitted from different TRPs.

In one embodiment, in a twentieth communication 954 transmitted from the first TRP 902 to the UE 910, the first TRP 902 may transmit a third data packet to the UE 910. In various embodiments, in a twenty-first communication 956 transmitted from the second TRP 904 to the UE 910, the second TRP 904 may also transmit the third data packet to the UE 910. In one embodiment, in a twenty-second communication 958 transmitted from the third TRP 906 to the UE 910, the third TRP 906 may also transmit the third data packet to the UE 910. In various embodiments, in a twenty-third communication 960 transmitted from the fourth TRP 908 to the UE 910, the fourth TRP 908 may also transmit the third data packet to the UE 910. In certain embodiments, in a twenty-fourth communication 962 transmitted from the UE 910 to the first TRP 902, the UE 910 may transmit ACK/NACK to indicate whether the third data packet was received correctly. In this example, the UE 910 transmits ACK to indicate that the third data packet was received correctly.

In various embodiments, if DL packets are transmitted from single TRPs to a UE and if a number of consecutive data packets lost reaches a certain threshold, then either repetition is applied to subsequent data packets from multiple TRPs or the subsequent packet is transmitted from a different TRP.

In one embodiment, a gNB schedules consecutive new DL packets of a radio bearer from a single TRP to a UE in which one UL feedback resource is configured for a single and/or joint feedback for multiple packets. In certain embodiments, a TRP transmits DL packets to a UE.

As may be appreciated, a feedback resource may not necessarily be related to L1 HARQ feedback or a request for retransmissions, but the feedback resource may be related to an error state or downtime of a communication system after failing to receive n consecutive DL packets.

In certain embodiments, each feedback resource is configured after n DL packets wherein n<loss tolerance. The feedback resource may be an L1 feedback that may be periodically configured in PUCCH, L2 feedback as part of a MAC CE, L3 feedback as part of RLC, or a PDCP status report.

In various embodiments, in the feedback resource a UE reports '0' or 'no error' which means that one of n packets was correctly received, and reports '1' or 'error' if all n packets are lost.

Upon receiving the feedback '1' or error from the UE, a TRP may enable other TRPs to jointly transmit (n+1)th DL data packet to enhance reliability. In such embodiments, the TRP may transmit (n+1)th DL data packet from another TRP that has better link quality based on a CSI report from a UE, wherein the CSI report may be either separately or jointly sent to corresponding TRPs or the primary TRP.

In some embodiments, a TRP may derive an error state based only on ACK/NACK from n consecutive data packets. If HARQ is configured, the TRP declares an error state after consuming all HARQ retransmissions for the n packets and may configure M-TRP joint transmission of the following packet or apply different time or frequency repetitions, as described in FIG. 9.

Figure 10:
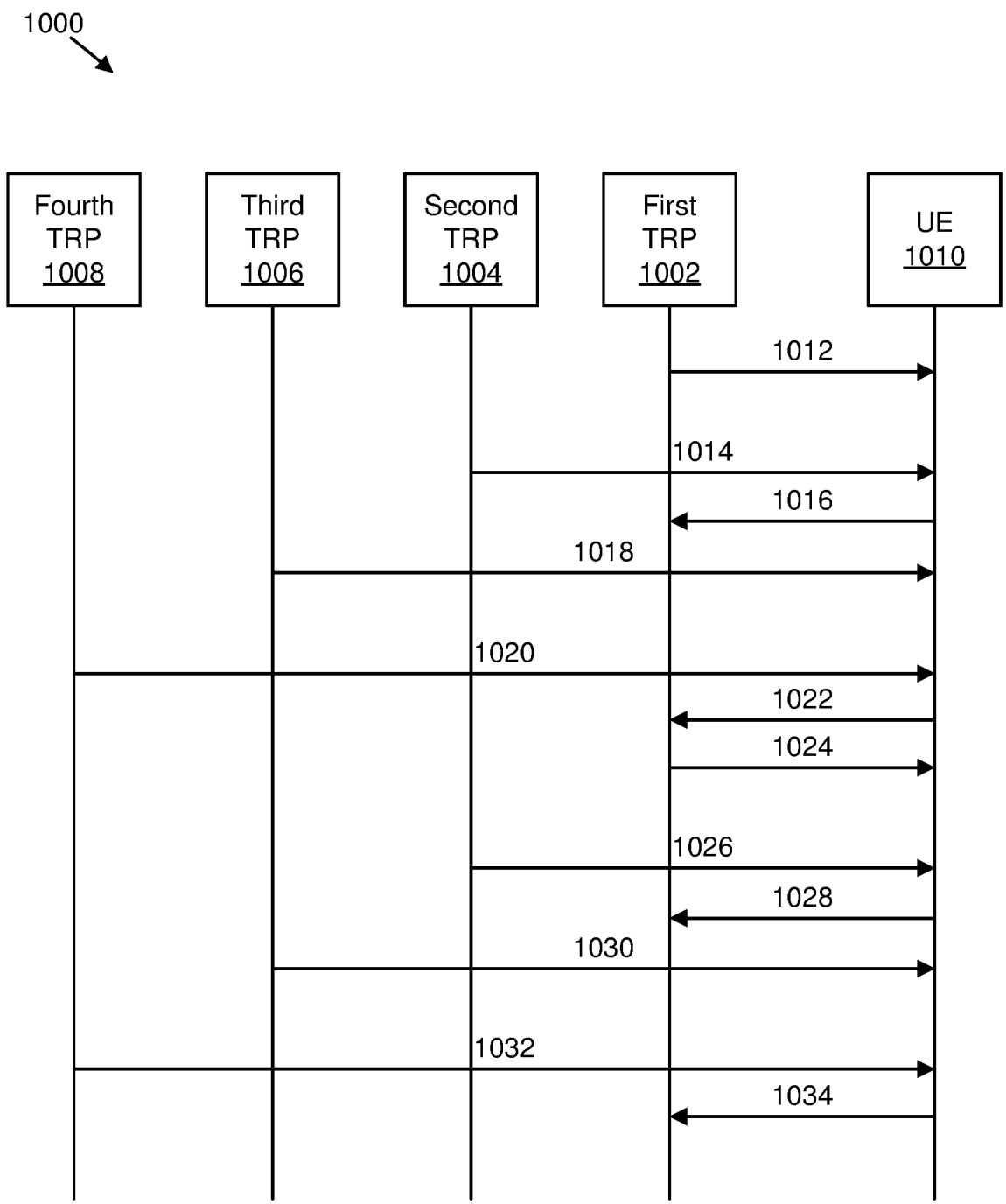
FIG. 10 is a communication diagram illustrating one embodiment of communications that may include DL packet discarding.

In various embodiments, a TRP may intentionally discard or preempt transmission of one or more DL data packets if the previous data packets were successfully received, as shown in FIG. 10.

Specifically, FIG. 10 is a communication diagram illustrating one embodiment of communications 1000 that may include DL packet discarding. The communications 1000 may include communications between a first TRP 1002, a second TRP 1004, a third TRP 1006, a fourth TRP 1008, and a UE 1010. As may be appreciated, descriptions of communications 1000 contained herein may refer to one or more messages transmitted between devices.

In one embodiment, in a first communication 1012 transmitted from the first TRP 1002 to the UE 1010, the first TRP 1002 may transmit a first data packet to the UE 1010. In some embodiments, in a second communication 1014 transmitted from the second TRP 1004 to the UE 1010, the second TRP 1004 may transmit a second data packet to the UE 1010. In various embodiments, in a third communication 1016 transmitted from the UE 1010 to the first TRP 1002, the UE 1010 may transmit a low-resolution feedback to the first TRP 1002. The first TRP 1002 may be configured as a primary TRP that receives all feedback messages from the UE 1016. In the present embodiment, the feedback may indicate that there is no error.

In certain embodiments, in a fourth communication 1018 transmitted from the third TRP 1006 to the UE 1010, the third TRP 1006 may transmit a third data packet to the UE 1010. In the present embodiment, the fourth communication 1018 may be skipped (e.g., discarded, preempted, bypassed) because the third communication 1016 indicated that there was no error. In such an embodiment, the loss tolerance may be 4 data packets, so if there is no error in 2 data packets, 1 data packet may be skipped. In some embodiments, in a fifth communication 1020 transmitted from the fourth TRP 1008 to the UE 1010, the fourth TRP 1008 may transmit a fourth data packet to the UE 1010. In various embodiments, in a sixth communication 1022 transmitted from the UE 1010 to the first TRP 1002, the UE 1010 may transmit a low-resolution feedback to the first TRP 1002. In the present embodiment, the feedback may indicate that there is no error.

In one embodiment, in a seventh communication 1024 transmitted from the first TRP 1002 to the UE 1010, the first TRP 1002 may transmit a fifth data packet to the UE 1010. In some embodiments, in an eighth communication 1026 transmitted from the second TRP 1004 to the UE 1010, the second TRP 1004 may transmit a sixth data packet to the UE 1010. In the present embodiment, the eighth communication 1026 may be skipped (e.g., discarded, preempted, bypassed) because the sixth communication 1022 indicated that there was no error. In such an embodiment, the loss tolerance may be 4 data packets, so if there is no error in 2 data packets, 1 data packet may be skipped. In various embodiments, in a ninth communication 1028 transmitted from the UE 1010 to the first TRP 1002, the UE 1010 may transmit a low-resolution feedback to the first TRP 1002. In the present embodiment, the feedback may indicate that there is no error.

In certain embodiments, in a tenth communication 1030 transmitted from the third TRP 1006 to the UE 1010, the third TRP 1006 may transmit a seventh data packet to the UE 1010. In some embodiments, in an eleventh communication 1032 transmitted from the fourth TRP 1008 to the UE 1010, the fourth TRP 1008 may transmit an eighth data packet to the UE 1010. In various embodiments, in a twelfth communication 1034 transmitted from the UE 1010 to the first TRP 1002, the UE 1010 may transmit a low-resolution feedback to the first TRP 1002. In the present embodiment, the feedback may indicate that there is no error.

In certain embodiments, a gNB schedules consecutive new DL packets of a radio bearer from multiple TRPs to a UE. In such embodiments, one UL feedback resource may be configured for joint and/or single feedback to be transmitted to a primary TRP or one of the TRPs for multiple DL packets.

In some embodiments, each TRP transmits different DL packet to the UE and the number of TRPs configured depends on a loss tolerance.

In various embodiments, a feedback resource is not related to L1 HARQ feedback or request for retransmissions but the feedback is related to an error state or downtime of a communication system after failing to receive n consecutive DL packets.

In certain embodiments, each feedback resource is configured after n DL packets wherein n<loss tolerance. The feedback resource may be an L1 feedback which could be periodically configured in PUCCH, L2 feedback as part of a MAC CE, L3 feedback as part of RLC, or a PDCP status report.

In some embodiments, a primary TRP may be defined or assumed by a UE as follows: 1) for single DCI based M-TRP operation, a TRP associated with transmission of DCI may be considered the primary TRP, where the principle of associating DCI with a CORESETPOOLIndex and with TRP (e.g., TCI state) may be applied; 2) for multi DCI based M-TRP operation and joint feedback, the primary TRP may be defined as one that is associated with the CORESETPOOLIndex that has CORESET with DCI having PUCCH resources (and related parameters such as DAI) for joint feedback transmission; and/or 3) the primary TRP may be assumed to be the TRP associated with a first TCI state that is indicated in the DCI.

In various embodiments, a UE reports in a feedback resource '0' or 'no error' if one of n packets was correctly received and reports '1' or 'error' if all n packets are lost. Upon receiving a feedback of '1' or error from the UE, a gNB may configure joint transmission for (n+1)th DL packet from multiple TRPs to enhance reliability. Upon receiving feedback '0' or 'no error' from a UE, the gNB may discard some of the following messages and allocate the resources for another UE that is in an error state.

In certain embodiments, a gNB may derive an error state based only on ACK/NACK of n consecutive data packets. If HARQ is configured, the gNB may declare an error state after consuming all HARQ retransmissions for the n packets. It should be noted that as used herein gNB may refer to a TRP and/or a TRP may be a gNB.

In some embodiments, single and/or joint feedback may be repeated using M-TRP after n consecutive DL packets are lost. In such embodiments, the repetition may either be in SDM, FDM, or TDM manner.

In various embodiments, if DL packets are transmitted from single TRPs to a UE and if a number of consecutive data packets lost reaches a certain threshold, then a number of repetition and/or retransmissions may be increased in L1 for subsequent DL packets.

In certain embodiments, L1 repetition and/or retransmission is not enabled in L1 and if a low-resolution feedback indicates an error, then repetition and/or retransmission is enabled for at least a subsequent DL packet. In some embodiments, repetition and/or retransmission is done using the same transmission parameters, such as the same MCS, used for previous DL packets.

In various embodiments, repetition and/or retransmission is done using at least some different transmission parameters, such as a lower MCS, in comparison to previous DL packets. In certain embodiments, repetition and/or retransmission is done from a single TRP. In some embodiments, repetition and/or retransmission is done from multiple TRPs.

In various embodiments, multiple threshold values for a number of consecutive data packets lost are configured by a network. In such embodiments, with every increasing threshold value, a number of repetitions and/or retransmissions may be increased.

In certain embodiments, a single TRP is used for multiple repetitions and/or retransmissions. In some embodiments, a number of TRPs used for repetition for subsequent data packets may gradually increase with every increased threshold value. For example, the number TRPs may be directly proportional to the number of repetitions and/or retransmissions.

In various embodiments, if multiple threshold values are configured by a network in terms of a number of consecutive data packets lost and if feedback received by a gNB at a given threshold value is not in error, then a threshold counter may be reset and a number of repetitions for subsequent data packets may be reduced.

Figure 11:
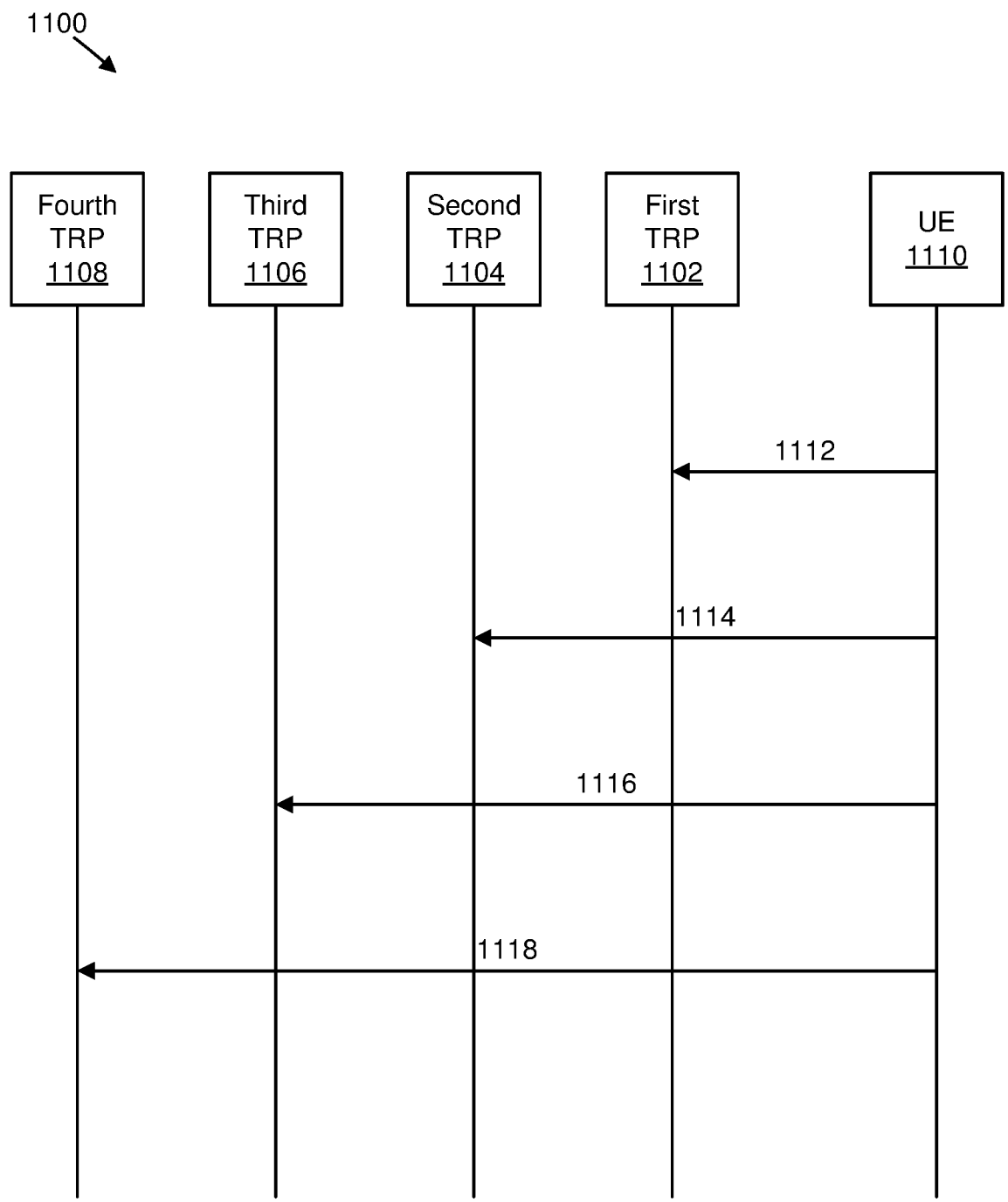
FIG. 11 is a communication diagram illustrating one embodiment of communications in which there is consecutive UL packet transmission to multiple TRPs.

In certain embodiments, if multiple UL packets are transmitted from multiple panels of a UE (e.g., as shown in FIG. 11) and if a number of consecutive data packets lost reaches a certain threshold, then repetition may be applied to subsequent data packets from at least more than one panel.

Specifically, FIG. 11 is a communication diagram illustrating one embodiment of communications 1100 in which there is consecutive UL packet transmission to multiple TRPs. The communications 1100 may include communications between a first TRP 1102, a second TRP 1104, a third TRP 1106, a fourth TRP 1108, and a UE 1110. As may be appreciated, descriptions of communications 1100 contained herein may refer to one or more messages transmitted between devices.

In one embodiment, in a first communication 1112 transmitted from the UE 1110 to the first TRP 1102, the UE 1110 may transmit a first data packet to the first TRP 1102. In some embodiments, in a second communication 1114 transmitted from the UE 1110 to the second TRP 1104, the UE 1110 may transmit a second data packet to the second TRP 1104. In various embodiments, in a third communication 1116 transmitted from the UE 1110 to the third TRP 1106, the UE 1110 may transmit a third data packet to the third TRP 1106. In certain embodiments, in a fourth communication 1118 transmitted from the UE 1110 to the fourth TRP 1108, the UE 1110 may transmit a fourth data packet to the fourth TRP 1108.

In various embodiments, for UL transmission, a UE may transmit consecutive UL packets from multiple panels to single or multiple TRPs. Whether the UL packets are transmitted to single or multiple TRPs may depend on an UL-ST, a number of UE panels, and a current link quality corresponding to the multiple TRPs. There could be different options for reacting after there are m UL failed messages, where m<UL ST. For example, in a first option, a lower MCS may be applied for following packets. As another example, in a second option, there may be repetition (e.g., FDM, SDM) in which a packet m+1 is sent from multiple panels to a single or multiple TRPs, or TDM if a cycle time allows for repetition in intra or inter slot. To benefit from space diversity, a UE may switch a TX panel for each repetition.

In certain embodiments, if multiple UL packets are scheduled or enabled (e.g., for a configured grant) by a single DCI to be transmitted from a UE in a consecutive slots and/or mini-slots and if a number of consecutive data packets lost reaches a certain threshold, then repetition may be applied to subsequent data packets in which a number of repetitions and resources are scheduled or enabled by a single DCI.

In various embodiments, a single panel of a UE may be used for transmitting multiple packets to a single TRP before a certain threshold is reached in terms of a number of consecutive data packets lost, after which, multi-panel UL transmission may be enabled to: 1) use multiple panels for repetition of a subsequent packet from all active panels; 2) use multiple panels for transmitting different data packets from all active panels; and/or 3) use some panels for repetitions and some panels for different data packets. As may be appreciated, various method of repetition from multiple active panels may be transmitted to a single or multiple TRPs. Furthermore, certain methods of repetition may also be implemented by activating a configured grant from multiple antenna panels after a certain threshold is reached. The threshold may be based on receiving a single or consecutive non-toggled NDI from a gNB UL grant or based on ACK/NACK feedback from the gNB. It should be noted that some methods of repetition from multiple antenna panels may be implicitly activated based on the threshold or explicitly activated in an UL grant.

In some embodiments, a beamFailureInstanceMaxCount from a TRP may be within a survival time or loss tolerance value. In certain embodiments, there may be a beam loss indication from lower layers or BFI COUNTER above certain threshold that may enable repetition of UL packets from a single or multiple active antenna panels to single or multiple TRPs.

In various embodiments, feedback may be enhanced by, instead of transmitting only error or no error, a UE reports a counter value. In such embodiments, the counter may indicate a last consecutive number of DL packets lost.

In certain embodiments, only a counter value is reported by a UE instead of error or no error. In some embodiments, both a counter value and a bit indicating error or no error is reported.

In various embodiments, multiple thresholds may be defined along with counter type feedback. In such embodiments, the threshold values may be dynamically changed depending on a counter feedback value. In a first example, if a loss tolerance is 10, then a UE may report first feedback after 5 data packets. If the counter feedback is 5, for example, then the UE may report second feedback after the next 2 data packets. In a second example, if a loss tolerance is 10, then a UE may report first feedback after 5 data packets. If the counter feedback is 0, for example, then the UE may report second feedback after the next 5 data packets.

As described in various embodiments found herein: 1) ST based error-handling feedback may be different than L1 HARQ, wherein a gNB may configure a UE to trigger an error state after a certain number of failed packets n (n<ST in terms of maximum allowed consecutive lost packets—for example, n may be less than the survival time); 2) an iterative repetition scheme may be used in which a number of repetitions is increased gradually depending upon a number of consecutive lost packets (this may enable efficient resource utilization by avoiding an unnecessary number of repetitions if the number of packets lost is lower than configured threshold values; 3) ST based switching between single TRP and multi-TRP operation may be used for DL transmission; and/or 4) ST based switching between single panel and multi-panel operation may be used for UL transmission.

Figure 12:
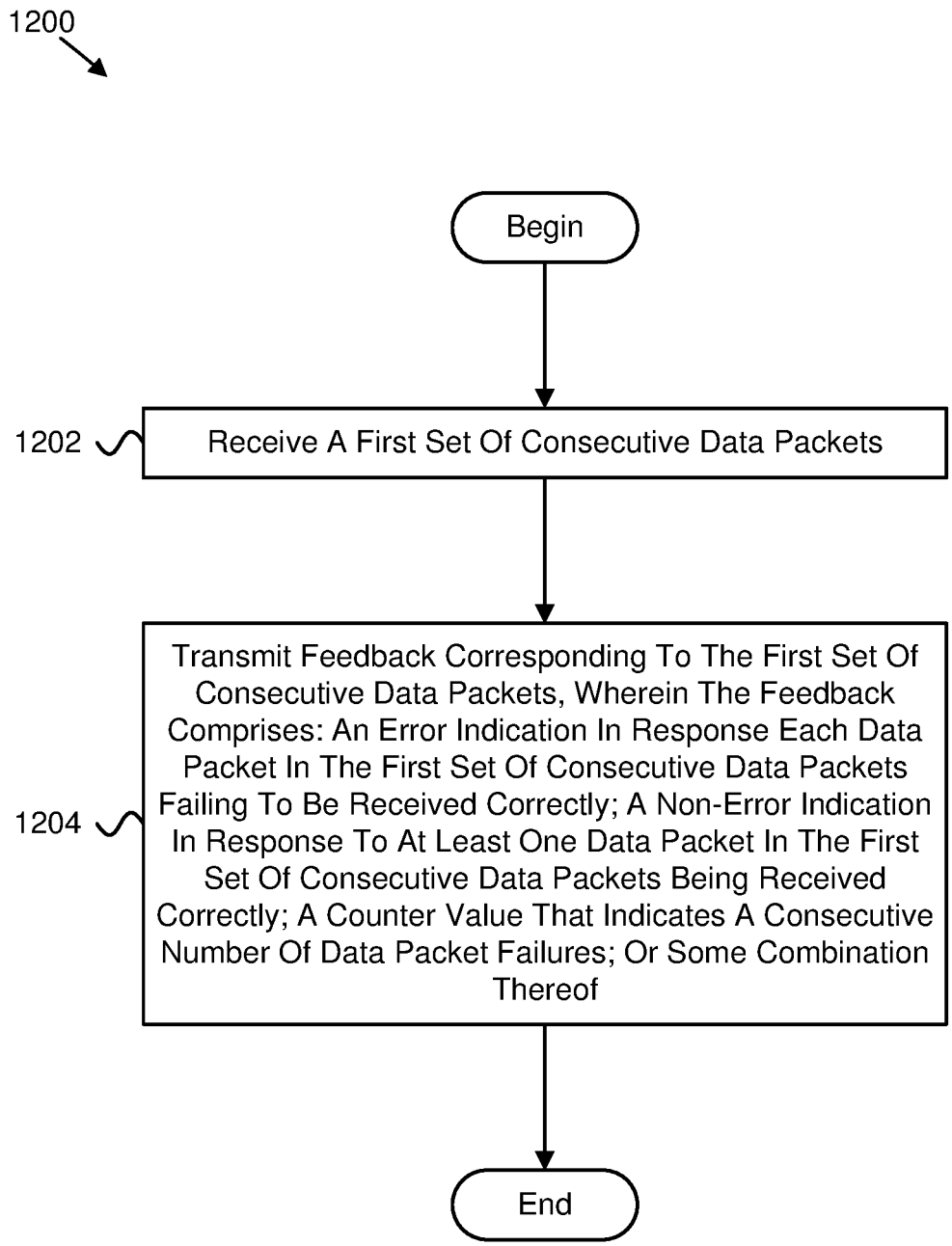
FIG. 12 is a flow chart diagram illustrating one embodiment of a method for consecutive data packet feedback.

FIG. 12 is a flow chart diagram illustrating one embodiment of a method 1200 for consecutive data packet feedback. In some embodiments, the method 1200 is performed by an apparatus, such as the remote unit 102. In certain embodiments, the method 1200 may be performed by a processor executing program code, for example, a microcontroller, a microprocessor, a CPU, a GPU, an auxiliary processing unit, a FPGA, or the like.

The method 1200 may include receiving 1202 a first set of consecutive data packets. In certain embodiments, the method 1200 includes transmitting 1204 feedback corresponding to the first set of consecutive data packets, wherein the feedback comprises: an error indication in response each data packet in the first set of consecutive data packets failing to be received correctly; a non-error indication in response to at least one data packet in the first set of consecutive data packets being received correctly; a counter value that indicates a consecutive number of data packet failures; or some combination thereof.

In certain embodiments, the method 1200 further comprises receiving a second set of consecutive data packets after receiving the first set of consecutive data packets, wherein the second set of consecutive data packets are transmitted from a plurality of transmission points in response to: the feedback comprising the error indication, the counter value being greater than a predetermined threshold, or a combination thereof and the first set of consecutive data packets being transmitted from a single transmission point. In some embodiments, the method 1200 further comprises receiving a second set of consecutive data packets after receiving the first set of consecutive data packets, wherein the second set of consecutive data packets are repeatedly transmitted from a single transmission point in response to the feedback comprising the error indication, the counter value being greater than a predetermined threshold, or a combination thereof.

In various embodiments, the method 1200 further comprises receiving a second set of consecutive data packets after receiving the first set of consecutive data packets, wherein the second set of consecutive data packets are repeatedly transmitted from a plurality of transmission points in response to: the feedback comprising the error indication, the counter value being greater than a predetermined threshold, or a combination thereof and the first set of consecutive data packets being transmitted from the plurality of transmission points. In one embodiment, the method 1200 further comprises receiving a second set of consecutive data packets after receiving the first set of consecutive data packets, wherein the second set of consecutive data packets are repeatedly transmitted from a plurality of transmission points in response to the feedback comprising the error indication, the counter value being greater than a predetermined threshold, or a combination thereof.

In certain embodiments, the method 1200 further comprises configuring a plurality of thresholds that each indicate a number of consecutive data packets possible in the first set of consecutive data packets, wherein a number of times the second set of consecutive data packets is retransmitted corresponds to each threshold of the plurality of thresholds. In some embodiments, the method 1200 further comprises reducing or maintaining a number of retransmissions of the second set of consecutive data packets in response to the feedback comprising the non-error indication, the counter value being less than a predetermined threshold, or a combination thereof.

Figure 13:
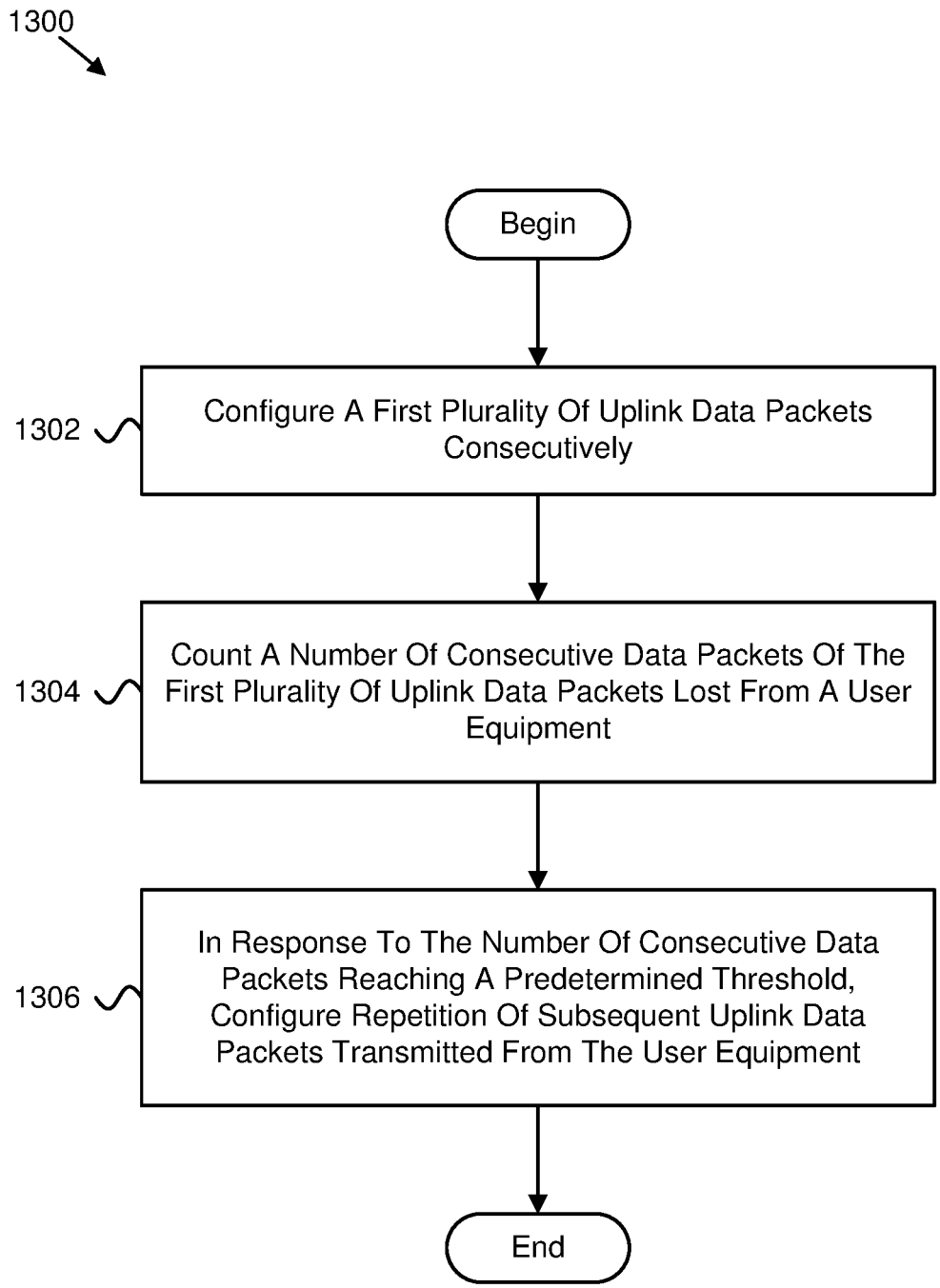
FIG. 13 is a flow chart diagram illustrating another embodiment of a method for consecutive data packet feedback.

FIG. 13 is a flow chart diagram illustrating another embodiment of a method 1300 for consecutive data packet feedback. In some embodiments, the method 1300 is performed by an apparatus, such as the network unit 104. In certain embodiments, the method 1300 may be performed by a processor executing program code, for example, a microcontroller, a microprocessor, a CPU, a GPU, an auxiliary processing unit, a FPGA, or the like.

The method 1300 may include configuring 1302 a first plurality of uplink data packets consecutively. In certain embodiments, the method 1300 includes counting 1304 a number of consecutive data packets of the first plurality of uplink data packets lost from a user equipment. In some embodiments, the method 1300 includes, in response to the number of consecutive data packets reaching a predetermined threshold, configuring 1306 repetition of subsequent uplink data packets transmitted from the user equipment.

In certain embodiments, the first plurality of uplink data packets is configured in a configured grant resource or using downlink control information. In some embodiments, the repetition of subsequent uplink data packets is transmitted from multiple panels of the user equipment in response to the number of consecutive data packets reaching the predetermined threshold. In various embodiments, a second plurality of uplink data packets is transmitted from multiple panels of the user equipment in response to the number of consecutive data packets reaching the predetermined threshold.

Figure 14:
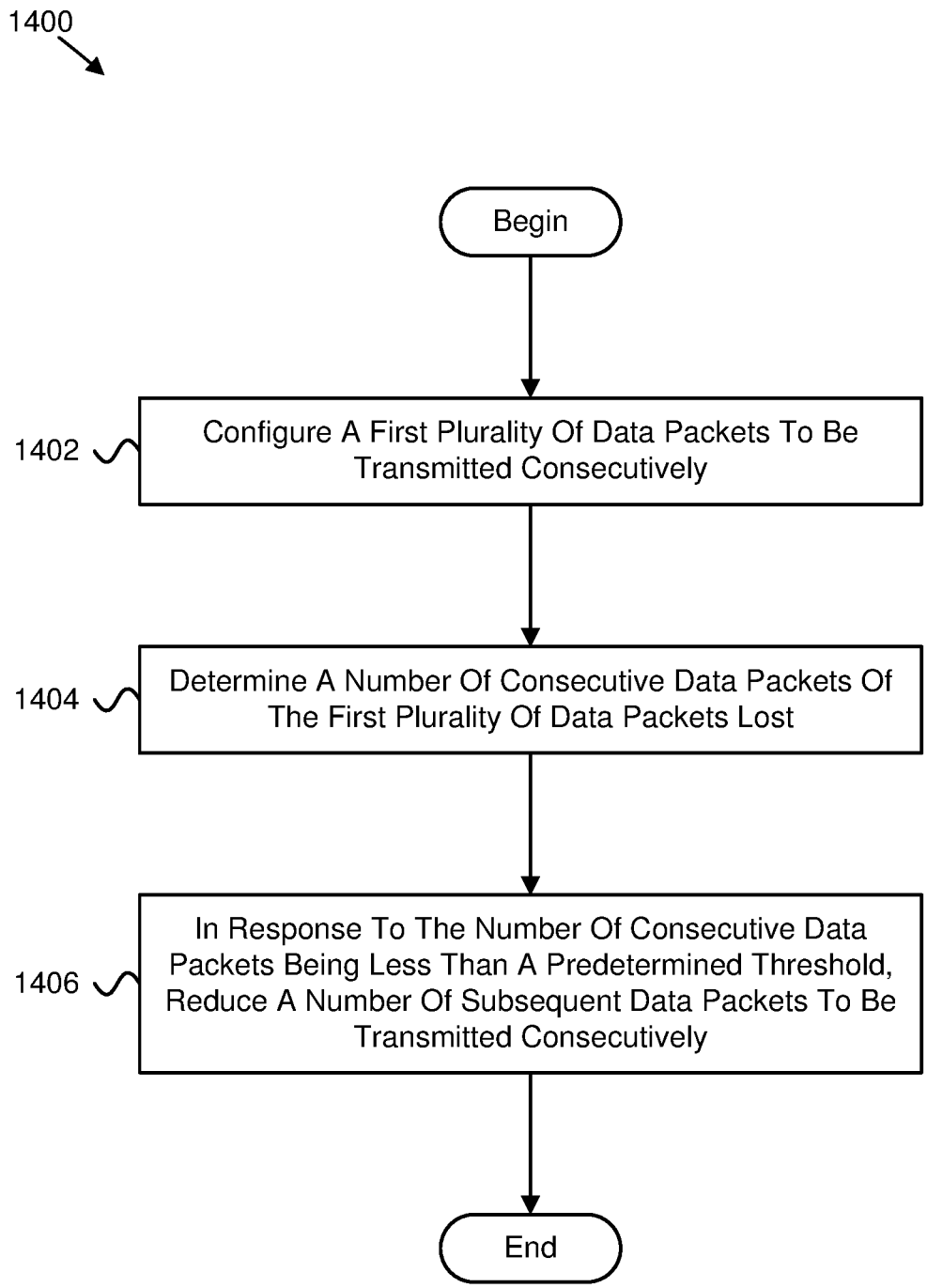
FIG. 14 is a flow chart diagram illustrating a further embodiment of a method for consecutive data packet feedback.

FIG. 14 is a flow chart diagram illustrating a further embodiment of a method 1400 for consecutive data packet feedback. In some embodiments, the method 1400 is performed by an apparatus, such as the remote unit 102 and/or the network unit 104. In certain embodiments, the method 1400 may be performed by a processor executing program code, for example, a microcontroller, a microprocessor, a CPU, a GPU, an auxiliary processing unit, a FPGA, or the like.

The method 1400 may include configuring 1402 a first plurality of data packets to be transmitted consecutively. In certain embodiments, the method 400 includes determining 1404 a number of consecutive data packets of the first plurality of data packets lost. In some embodiments, the method 1400 includes, in response to the number of consecutive data packets being less than a predetermined threshold, reducing 1406 a number of subsequent data packets to be transmitted consecutively.

In certain embodiments, the first plurality of data packets comprises uplink data packets. In some embodiments, the first plurality of data packets comprises downlink data packets.

In one embodiment, a method comprises: receiving a first set of consecutive data packets; and transmitting feedback corresponding to the first set of consecutive data packets, wherein the feedback comprises: an error indication in response each data packet in the first set of consecutive data packets failing to be received correctly; a non-error indication in response to at least one data packet in the first set of consecutive data packets being received correctly; a counter value that indicates a consecutive number of data packet failures; or some combination thereof.

In certain embodiments, the method further comprises receiving a second set of consecutive data packets after receiving the first set of consecutive data packets, wherein the second set of consecutive data packets are transmitted from a plurality of transmission points in response to: the feedback comprising the error indication, the counter value being greater than a predetermined threshold, or a combination thereof and the first set of consecutive data packets being transmitted from a single transmission point.

In some embodiments, the method further comprises receiving a second set of consecutive data packets after receiving the first set of consecutive data packets, wherein the second set of consecutive data packets are repeatedly transmitted from a single transmission point in response to the feedback comprising the error indication, the counter value being greater than a predetermined threshold, or a combination thereof.

In various embodiments, the method further comprises receiving a second set of consecutive data packets after receiving the first set of consecutive data packets, wherein the second set of consecutive data packets are repeatedly transmitted from a plurality of transmission points in response to: the feedback comprising the error indication, the counter value being greater than a predetermined threshold, or a combination thereof; and the first set of consecutive data packets being transmitted from the plurality of transmission points.

In one embodiment, the method further comprises receiving a second set of consecutive data packets after receiving the first set of consecutive data packets, wherein the second set of consecutive data packets are repeatedly transmitted from a plurality of transmission points in response to the feedback comprising the error indication, the counter value being greater than a predetermined threshold, or a combination thereof.

In certain embodiments, the method further comprises configuring a plurality of thresholds that each indicate a number of consecutive data packets possible in the first set of consecutive data packets, wherein a number of times the second set of consecutive data packets is retransmitted corresponds to each threshold of the plurality of thresholds.

In some embodiments, the method further comprises reducing or maintaining a number of retransmissions of the second set of consecutive data packets in response to the feedback comprising the non-error indication, the counter value being less than a predetermined threshold, or a combination thereof.

In one embodiment, an apparatus comprises: a receiver that receives a first set of consecutive data packets; and a transmitter that transmits feedback corresponding to the first set of consecutive data packets, wherein the feedback comprises: an error indication in response each data packet in the first set of consecutive data packets failing to be received correctly; a non-error indication in response to at least one data packet in the first set of consecutive data packets being received correctly; a counter value that indicates a consecutive number of data packet failures; or some combination thereof.

In certain embodiments, the receiver receives a second set of consecutive data packets after receiving the first set of consecutive data packets, and the second set of consecutive data packets are transmitted from a plurality of transmission points in response to: the feedback comprising the error indication, the counter value being greater than a predetermined threshold, or a combination thereof and the first set of consecutive data packets being transmitted from a single transmission point.

In some embodiments, the receiver receives a second set of consecutive data packets after receiving the first set of consecutive data packets, and the second set of consecutive data packets are repeatedly transmitted from a single transmission point in response to the feedback comprising the error indication, the counter value being greater than a predetermined threshold, or a combination thereof.

In various embodiments, the receiver receives a second set of consecutive data packets after receiving the first set of consecutive data packets, and the second set of consecutive data packets are repeatedly transmitted from a plurality of transmission points in response to: the feedback comprising the error indication, the counter value being greater than a predetermined threshold, or a combination thereof and the first set of consecutive data packets being transmitted from the plurality of transmission points.

In one embodiment, the receiver receives a second set of consecutive data packets after receiving the first set of consecutive data packets, and the second set of consecutive data packets are repeatedly transmitted from a plurality of transmission points in response to the feedback comprising the error indication, the counter value being greater than a predetermined threshold, or a combination thereof.

In certain embodiments, the apparatus further comprises a processor that configures a plurality of thresholds that each indicate a number of consecutive data packets possible in the first set of consecutive data packets, and a number of times the second set of consecutive data packets is retransmitted corresponds to each threshold of the plurality of thresholds.

In some embodiments, the apparatus further comprises a processor that reduces or maintains a number of retransmissions of the second set of consecutive data packets in response to the feedback comprising the non-error indication, the counter value being less than a predetermined threshold, or a combination thereof.

In one embodiment, a method comprises: configuring a first plurality of uplink data packets consecutively; counting a number of consecutive data packets of the first plurality of uplink data packets lost from a user equipment; and, in response to the number of consecutive data packets reaching a predetermined threshold, configuring repetition of subsequent uplink data packets transmitted from the user equipment.

In certain embodiments, the first plurality of uplink data packets is configured in a configured grant resource or using downlink control information.

In some embodiments, the repetition of subsequent uplink data packets is transmitted from multiple panels of the user equipment in response to the number of consecutive data packets reaching the predetermined threshold.

In various embodiments, a second plurality of uplink data packets is transmitted from multiple panels of the user equipment in response to the number of consecutive data packets reaching the predetermined threshold.

In one embodiment, an apparatus comprises: a processor that: configures a first plurality of uplink data packets consecutively; counts a number of consecutive data packets of the first plurality of uplink data packets lost from a user equipment; and, in response to the number of consecutive data packets reaching a predetermined threshold, configures repetition of subsequent uplink data packets transmitted from the user equipment.

In certain embodiments, the first plurality of uplink data packets is configured in a configured grant resource or using downlink control information.

In some embodiments, the repetition of subsequent uplink data packets is transmitted from multiple panels of the user equipment in response to the number of consecutive data packets reaching the predetermined threshold.

In various embodiments, a second plurality of uplink data packets is transmitted from multiple panels of the user equipment in response to the number of consecutive data packets reaching the predetermined threshold.

In one embodiment, a method comprises: configuring a first plurality of data packets to be transmitted consecutively; determining a number of consecutive data packets of the first plurality of data packets lost; and, in response to the number of consecutive data packets being less than a predetermined threshold, reducing a number of subsequent data packets to be transmitted consecutively.

In certain embodiments, the first plurality of data packets comprises uplink data packets.

In some embodiments, the first plurality of data packets comprises downlink data packets.

In one embodiment, an apparatus comprises: a processor that: configures a first plurality of data packets to be transmitted consecutively; determines a number of consecutive data packets of the first plurality of data packets lost; and, in response to the number of consecutive data packets being less than a predetermined threshold, reduces a number of subsequent data packets to be transmitted consecutively.

In certain embodiments, the first plurality of data packets comprises uplink data packets.

In some embodiments, the first plurality of data packets comprises downlink data packets.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
receiving a first set of consecutive data packets;
transmitting first feedback corresponding to the first set of consecutive data packets prior to receiving additional data packets, wherein the first feedback comprises a single bit that indicates feedback for the entire first set of consecutive data packets, and the single bit comprises:
an error indication in response to each data packet in the first set of consecutive data packets failing to be received correctly; or
a non-error indication in response to at least one data packet in the first set of consecutive data packets being received correctly;
receiving a second set of consecutive data packets; and
transmitting second feedback corresponding to the second set of consecutive data packets, wherein a second length of the second set of consecutive data packets is different than a first length of the first set of consecutive data packets, and the second length is determined based on a loss tolerance and the first feedback.

2. The method of claim 1, further comprising receiving the second set of consecutive data packets after receiving the first set of consecutive data packets, wherein the second set of consecutive data packets are transmitted from a plurality of transmission points in response to:
the feedback comprising the error indication, a counter value being greater than a predetermined threshold, or a combination thereof, wherein the counter value indicates a consecutive number of data packet failures; and
the first set of consecutive data packets being transmitted from a single transmission point.

3. The method of claim 1, further comprising receiving the second set of consecutive data packets after receiving the first set of consecutive data packets, wherein the second set of consecutive data packets are repeatedly transmitted from a single transmission point in response to the feedback comprising the error indication, a counter value being greater than a predetermined threshold, or a combination thereof, wherein the counter value indicates a consecutive number of data packet failures.

4. The method of claim 1, further comprising receiving the second set of consecutive data packets after receiving the first set of consecutive data packets, wherein the second set of consecutive data packets are repeatedly transmitted from a plurality of transmission points in response to:
the feedback comprising the error indication, a counter value being greater than a predetermined threshold, or a combination thereof, wherein the counter value indicates a consecutive number of data packet failures; and
the first set of consecutive data packets being transmitted from the plurality of transmission points.

5. The method of claim 1, further comprising receiving the second set of consecutive data packets after receiving the first set of consecutive data packets, wherein the second set of consecutive data packets are repeatedly transmitted from a plurality of transmission points in response to the feedback comprising the error indication, a counter value being greater than a predetermined threshold, or a combination thereof, wherein the counter value indicates a consecutive number of data packet failures.

6. The method of claim 1, further comprising configuring a plurality of thresholds that each indicate a maximum number of consecutive data packets in the first set of consecutive data packets, wherein a number of times the second set of consecutive data packets is repeated corresponds to each threshold of the plurality of thresholds.

7. The method of claim 1, further comprising reducing or maintaining a number of retransmissions of the second set of consecutive data packets in response to the feedback comprising the non-error indication, a counter value being less than a predetermined threshold, or a combination thereof, wherein the counter value indicates a consecutive number of data packet failures.

8. An apparatus comprising:
a receiver that receives a first set of consecutive data packets; and
a transmitter that transmits feedback corresponding to the first set of consecutive data packets, wherein the feedback comprises a single bit that indicates feedback for the entire first set of consecutive data packets, and the single bit comprises:
an error indication in response each data packet in the first set of consecutive data packets failing to be received correctly; or
a non-error indication in response to at least one data packet in the first set of consecutive data packets being received correctly; wherein:
the receiver receives a second set of consecutive data packets; and
the transmitter transmits second feedback corresponding to the second set of consecutive data packets, wherein a second length of the second set of consecutive data packets is different than a first length of the first set of consecutive data packets, and the second length is determined based on a loss tolerance and the first feedback.

9. The apparatus of claim 8, wherein the receiver receives the second set of consecutive data packets after receiving the first set of consecutive data packets, and the second set of consecutive data packets are transmitted from a plurality of transmission points in response to:
the feedback comprising the error indication, a counter value being greater than a predetermined threshold, or a combination thereof, wherein the counter value indicates a consecutive number of data packet failures; and
the first set of consecutive data packets being transmitted from a single transmission point.

10. The apparatus of claim 8, wherein the receiver receives the second set of consecutive data packets after receiving the first set of consecutive data packets, and the second set of consecutive data packets are repeatedly transmitted from a single transmission point in response to the feedback comprising the error indication, a counter value being greater than a predetermined threshold, or a combination thereof, wherein the counter value indicates a consecutive number of data packet failures.

11. The apparatus of claim 8, wherein the receiver receives the second set of consecutive data packets after receiving the first set of consecutive data packets, and the second set of consecutive data packets are repeatedly transmitted from a plurality of transmission points in response to:
the feedback comprising the error indication, a counter value being greater than a predetermined threshold, or a combination thereof, wherein the counter value indicates a consecutive number of data packet failures; and
the first set of consecutive data packets being transmitted from the plurality of transmission points.

12. The apparatus of claim 8, wherein the receiver receives the second set of consecutive data packets after receiving the first set of consecutive data packets, and the second set of consecutive data packets are repeatedly transmitted from a plurality of transmission points in response to the feedback comprising the error indication, a counter value being greater than a predetermined threshold, or a combination thereof, wherein the counter value indicates a consecutive number of data packet failures.

13. The apparatus of claim 8, further comprising a processor that configures a plurality of thresholds that each indicate a maximum number of consecutive data packets in the first set of consecutive data packets, and a number of times the second set of consecutive data packets is repeated corresponds to each threshold of the plurality of thresholds.

14. The apparatus of claim 8, further comprising a processor that reduces or maintains a number of retransmissions of the second set of consecutive data packets in response to the feedback comprising the non-error indication, a counter value being less than a predetermined threshold, or a combination thereof, wherein the counter value indicates a consecutive number of data packet failures.

15. A method comprising:
configuring a first plurality of uplink data packets consecutively;
counting a number of consecutive data packets of the first plurality of uplink data packets lost from a user equipment; and
in response to the number of consecutive data packets reaching a predetermined threshold greater than one, configuring repetition of subsequent uplink data packets transmitted from the user equipment, wherein a second length of the subsequent uplink data packets is different than a first length of the first plurality of uplink data packets, and the second length is determined based on a loss tolerance.

16. The method of claim 15, wherein the first plurality of uplink data packets is configured in a configured grant resource or using downlink control information.

17. The method of claim 15, wherein the repetition of subsequent uplink data packets is transmitted from multiple panels of the user equipment in response to the number of consecutive data packets reaching the predetermined threshold.

18. The method of claim 15, wherein a second plurality of uplink data packets is transmitted from multiple panels of the user equipment in response to the number of consecutive data packets reaching the predetermined threshold.

19. A method comprising:
configuring a first plurality of data packets to be transmitted consecutively;
determining a number of consecutive data packets of the first plurality of data packets lost; and
in response to the number of consecutive data packets being less than a predetermined threshold that is greater than one, feedback corresponding to previous data packets, or a combination thereof, reducing a number of subsequent data packets to be transmitted consecutively, wherein a second length of the subsequent uplink data packets is different than a first length of the first plurality of data packets, and the second length is determined based on a loss tolerance.

20. The method of claim 19, wherein the first plurality of data packets comprises either uplink data packets or downlink data packets.

* * * * *